United States Patent
Miyagaki

(10) Patent No.: US 8,732,428 B2
(45) Date of Patent: May 20, 2014

(54) COMPUTER SYSTEM AND ITS CONTROL METHOD

(75) Inventor: Atsushi Miyagaki, Odawara (JP)

(73) Assignee: Hitachi, Ltd., Tokyo (JP)

( * ) Notice: Subject to any disclaimer, the term of this patent is extended or adjusted under 35 U.S.C. 154(b) by 961 days.

(21) Appl. No.: 12/865,766

(22) PCT Filed: Jul. 23, 2010

(86) PCT No.: PCT/JP2010/004732
§ 371 (c)(1),
(2), (4) Date: Aug. 2, 2010

(87) PCT Pub. No.: WO2012/011157
PCT Pub. Date: Jan. 26, 2012

(65) Prior Publication Data
US 2012/0023301 A1    Jan. 26, 2012

(51) Int. Cl.
G06F 12/00 (2006.01)
G06F 3/06 (2006.01)

(52) U.S. Cl.
CPC ............ *G06F 3/0605* (2013.01); *G06F 3/0635* (2013.01); *G06F 3/067* (2013.01)
USPC ......................................... 711/170; 711/114

(58) Field of Classification Search
CPC ...... G06F 3/0605; G06F 3/0635; G06F 3/067
USPC .......... 711/162, 161, 170, E12.002, 202, 203, 711/114, 211
See application file for complete search history.

(56) References Cited

U.S. PATENT DOCUMENTS

| | | | |
|---|---|---|---|
| 7,136,862 B2* | 11/2006 | Mogi et al. | 707/999.101 |
| 7,395,396 B2* | 7/2008 | Takahashi et al. | 711/165 |
| 8,051,262 B2* | 11/2011 | Ichikawa et al. | 711/162 |
| 8,301,854 B2* | 10/2012 | Nakagawa et al. | 711/162 |
| 2008/0091898 A1* | 4/2008 | Takahashi et al. | 711/162 |
| 2008/0235404 A1 | 9/2008 | Awakura | |
| 2009/0182940 A1 | 7/2009 | Matsuda et al. | |
| 2010/0082925 A1* | 4/2010 | Irisawa et al. | 711/162 |

FOREIGN PATENT DOCUMENTS

| | | |
|---|---|---|
| EP | 1 357 476 A2 | 10/2003 |
| EP | 1 785 831 A2 | 5/2007 |
| JP | 2006-72440 A | 3/2006 |
| JP | 2007-114874 A | 5/2007 |

* cited by examiner

*Primary Examiner* — Pierre-Michel Bataille
(74) *Attorney, Agent, or Firm* — Mattingly & Malur, PC

(57) ABSTRACT

Provided is a system in which, when connecting an external storage apparatus to a primary storage apparatus, the setting of an external volume to be mapped to the primary storage apparatus can be set to the external storage apparatus by a volume creation request to the primary storage apparatus without requiring direct setting processing on the external storage apparatus. When an administrator registers, in the primary storage apparatus, a command for setting a volume to the external storage apparatus and the administrator executes processing for setting a volume to the primary storage apparatus, if the primary storage apparatus determines that it is necessary to create a volume in the external storage apparatus, the primary storage apparatus sends the registered command to the external storage apparatus so that the administrator can set the volume to the external storage apparatus via the primary storage apparatus.

11 Claims, 33 Drawing Sheets

FIG.11

STORAGE INFORMATION (1100)
- INDIVIDUAL STORAGE INFORMATION 1 (1102)
- INDIVIDUAL STORAGE INFORMATION 2
- INDIVIDUAL STORAGE INFORMATION 3
- ...

INDIVIDUAL STORAGE INFORMATION (1102)
- STORAGE INFORMATION ID (1006)
- VENDOR (EXAMPLE: HITACHI) (1006A)
- DEVICE NAME (EXAMPLE: USPV) (1006B)
- COMMAND ISSUANCE ROUTE TYPE (In Band / Out of Band) (1012)
- PORT INFORMATION ACQUISITION COMMAND (EXAMPLE: GetPortInfo) (1016)
- LOGICAL PATH INFORMATION ACQUISITION COMMAND (EXAMPLE: GetLogicalPathInfo %PortID%) (1018)
- UNUSED CAPACITY INFORMATION ACQUISITION COMMAND (EXAMPLE: GetUsableCapacity) (1020)
- VOLUME INFORMATION ACQUISITION COMMAND (EXAMPLE: GetVolumeInfo) (1022)
- VOLUME CREATION COMMAND (EXAMPLE: SetCreateVolume %VolumeID% %Capacity%) (1024)
- VOLUME DELETION COMMAND (EXAMPLE: SetDeleteVolume %VolumeID%) (1026)
- LOGICAL PATH SETTING COMMAND (EXAMPLE: SetLogicalPath %PortID% %LUN% %VolumeID%) (1028)
- LOGICAL PATH RELEASE COMMAND (EXAMPLE: SetReleasePath %PortID% %LUN%) (1030)
- MINIMUM VOLUME CAPACITY (1042)
- MAXIMUM VOLUME CAPACITY (1044)
- MAXIMUM TOTAL VOLUME CAPACITY (1046)
- MAXIMUM TOTAL NUMBER OF VOLUMES (1048)

(1240)

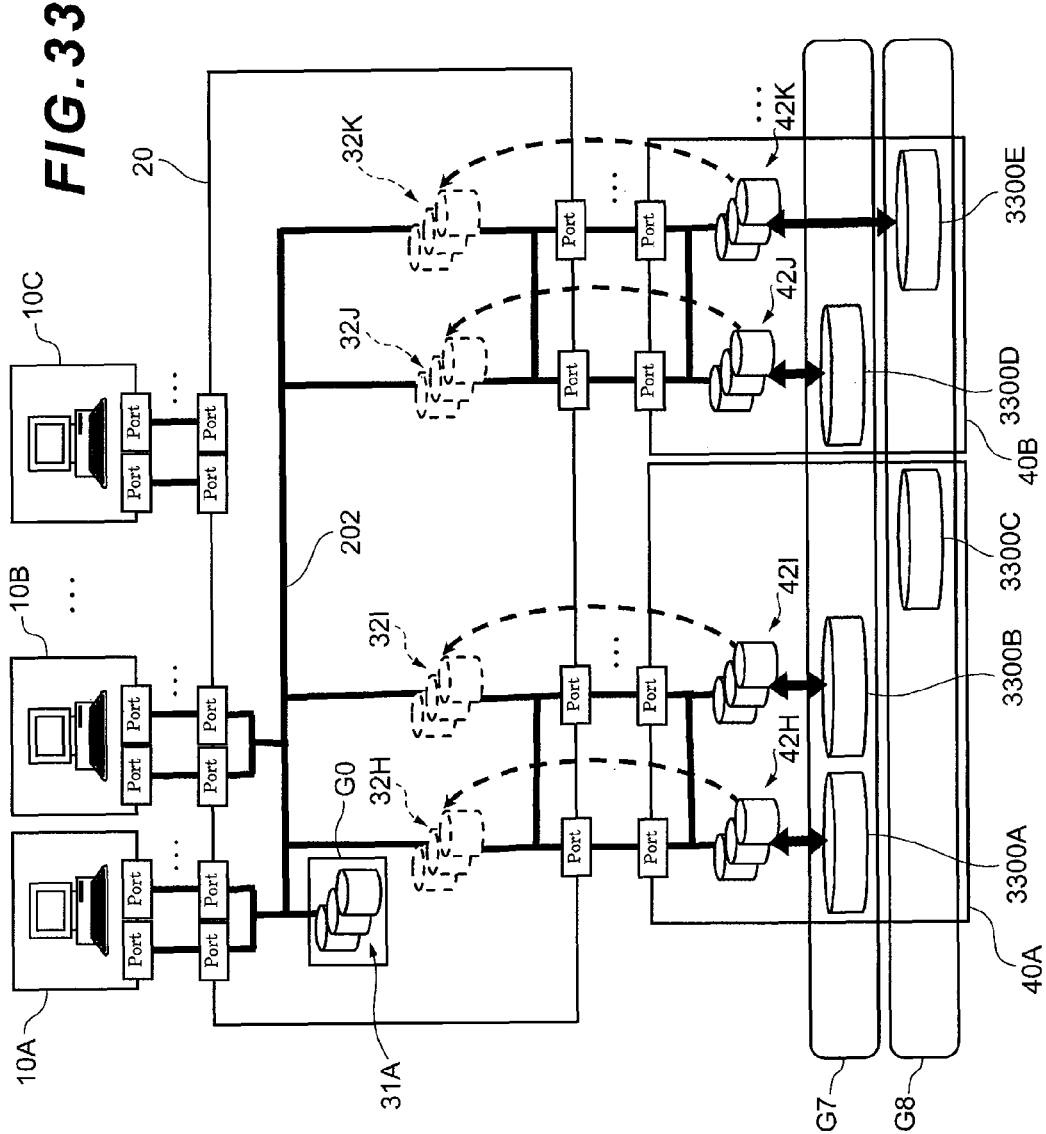

COMPUTER SYSTEM AND ITS CONTROL METHOD

TECHNICAL FIELD

The present invention relates to a computer system, in which a second computer system is externally connected to a first computer system, and a method for controlling such a computer system.

BACKGROUND ART

A storage apparatus capable of storing large-scale write data by managing a plurality of storage devices arranged in arrays by means of the RAID and controlling write accesses from a host computer has been known.

Recently, there has been a demand for integration of storage resources and consolidated management of the storage resources with respect to storage apparatuses. In order to fulfill such a demand, storage virtualization techniques are used.

One of the virtualization techniques is an external connection function. This external connection function is characterized in that another storage apparatus is connected to a primary storage apparatus via a Fibre Channel interface and a logical volume(s) of the other storage apparatus is mapped to a virtual volume(s) of the primary storage apparatus (Japanese Patent Application Laid-Open (Kokai) Publication No. 2007-114874).

Because of the external connection function, an administrator can operate and manage storage resources of the external storage apparatus connected to the primary storage apparatus in the same manner as internal storage devices of the primary storage apparatus. Therefore, even in an environment where pluralities of different types of storage apparatuses coexist, it is possible to realize unified data management; for example, it is possible to treat pluralities of different models of systems as if they were a single system. Also, the external connection function makes it possible to realize data migration operation between pluralities of different types of storage apparatuses in an integrated manner (Japanese Patent Application Laid-Open (Kokai) Publication No. 2006-072440).

CITATION LIST

Patent Literature

[PTL 1]
Japanese Patent Application Laid-Open (Kokai) Publication No. 2007-114874
[PTL 2]
Japanese Patent Application Laid-Open (Kokai) Publication No. 2006-072440

SUMMARY OF INVENTION

Technical Problem

When the administrator intends to construct a computer system in which an external storage apparatus is connected to a primary storage apparatus, they are required, while accessing the external storage apparatus separately from access to the primary storage apparatus and being aware of information about storage resources such as the unused capacity of the external storage apparatus, to directly execute a plurality of setting processing sequences on the external storage apparatus as follows:

(A) creating a logical volume, which is to be mapped to the primary storage apparatus, in the external storage apparatus;
(B) setting a logical path so that the volume can be recognized by the primary storage apparatus; and
(C) mapping the volume in the external storage apparatus to a virtual volume in the primary storage apparatus,
so that the host computer can recognize the volume in the external storage apparatus via the virtual volume(s).

Therefore, integrated management of a plurality of storage resources can be achieved by the external connection function; however, if the administrator intends to fulfill the external connection function, they cannot get away from excessive setting work to be done on the external storage apparatus in addition to setting work on the primary storage apparatus.

Meanwhile, when the administrator intends to create a volume in the computer system where the external connection function is fulfilled, they have to compare the quality of the storage resources for the primary storage apparatus with the quality of the storage resources for the external storage apparatus and examine which storage apparatus is more advantageous in terms of high-speed data processing and costs to set a volume. Therefore, system operation efficiency has been insufficient.

Accordingly, it is an object of the present invention to provide: a computer system in which, when connecting an external storage apparatus to a primary storage apparatus, the external storage apparatus can set an external volume to be mapped to the primary storage apparatus by means of a volume creation request to the primary storage apparatus without requiring direct setting processing on the external storage apparatus; and a method for controlling such a computer system.

It is another object of the invention to provide: a computer system in which an external storage apparatus is connected to a primary storage apparatus, wherein an administrator can set a volume without being aware of the difference between the primary storage apparatus and the external storage apparatus; and a method for controlling such a computer system.

Solution to Problem

In order to achieve the above-described objects, a computer system according to this invention is characterized in that when the administrator registers, in a primary storage apparatus, a command for setting a volume to an external storage apparatus and executes processing for setting a volume to the primary storage apparatus, if the primary storage apparatus determines that it is necessary to create a volume in the external storage apparatus, the primary storage apparatus sends the registered command to the external storage apparatus, thereby enabling the administrator to set the volume to the external storage apparatus via the primary storage apparatus.

Advantageous Effects of Invention

Therefore, in a computer system where an external storage apparatus is connected to a primary storage apparatus, a volume can be set to the external storage apparatus according to the present invention merely by the administrator issuing a volume setting request to the primary storage apparatus. So, the invention has the advantage that efficiency of the volume setting work can be achieved.

BRIEF DESCRIPTION OF DRAWINGS

FIG. 11 is an example of a storage information table.

FIG. 33 is a hardware block diagram of a computer system according to a second variation.

DESCRIPTION OF EMBODIMENTS

Figure 1:
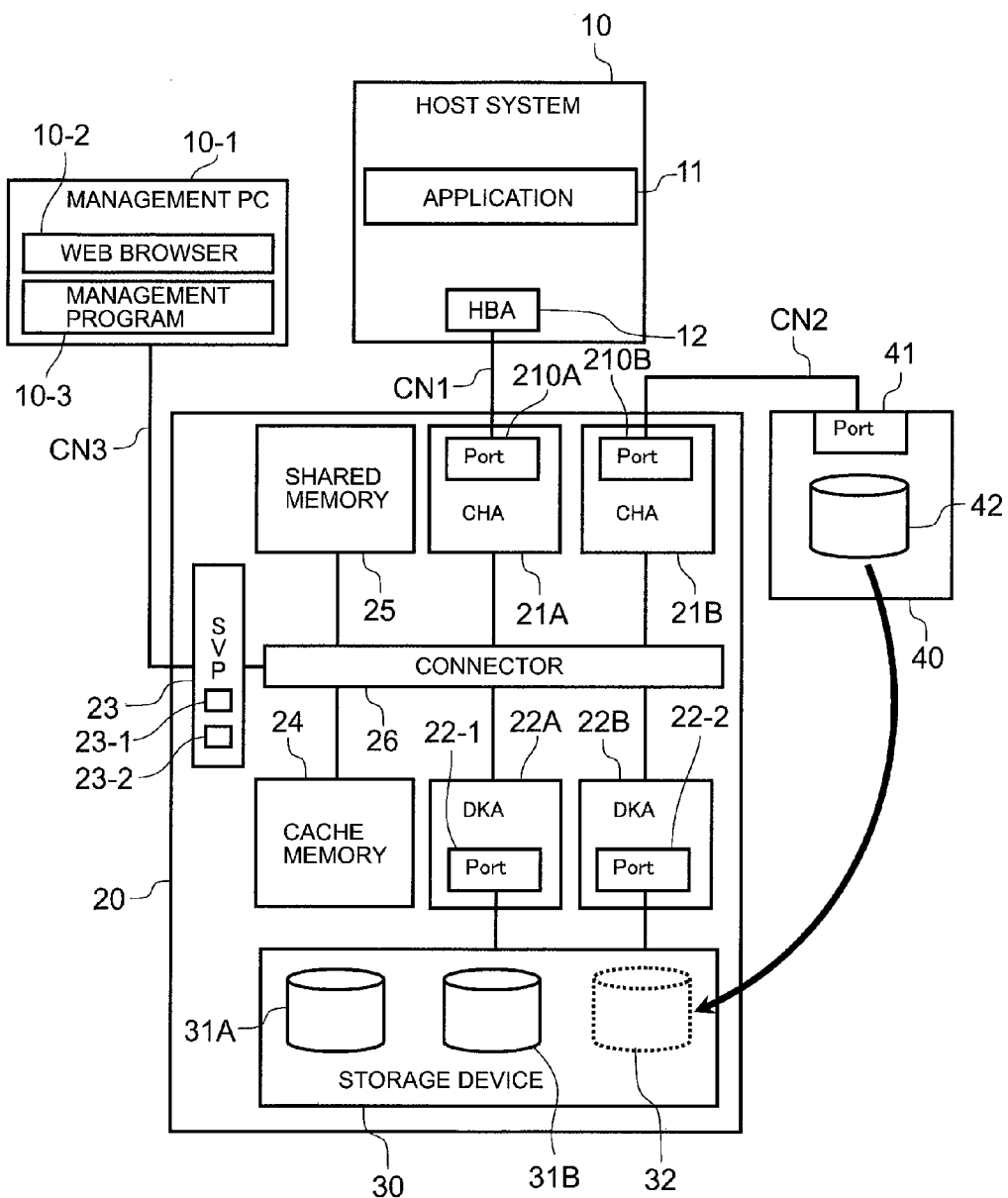
FIG. 1 is a hardware block diagram of a computer system according to this invention.

Next, an embodiment of this invention will be explained. FIG. 1 is a hardware block diagram of a storage system (computer system). The storage system includes a host 10, a management PC 10-1, a primary storage apparatus 20, and an external storage apparatus 40 externally connected to the primary storage apparatus. The host 10 is connected to the primary storage apparatus, the external storage apparatus 40 is connected to the primary storage apparatus 20, and the management PC 10-1 is connected to the primary storage apparatus.

The host 10 functions as a host system for storage apparatuses and issues a data read/write command to the storage apparatuses. The host computer is composed of a computer device equipped with information processing resources such as a CPU (Central Processing Unit) and a memory and can be realized as a personal computer, a workstation, or a mainframe. The host 10 is, for example, various open servers such as Windows, HP-UX, and Solaris (trademark name).

The host 10 includes information input devices such as a keyboard, a switch, a pointing device and/or a microphone, and information output devices such as a monitor display and/or a speaker. The host 10 also includes an application program 11 for reading data from, or writing data to, storage resources for the primary storage apparatus 20 and an HBA (Host Bus Adapter) 12 for accessing channel adapters (CHA) for the primary storage apparatus 20 via a communication network CN1.

The communication network CN1 is realized by, for example, a LAN, a SAN, the Internet, a private line, or a public line. Data communication via a LAN is performed according to TCP/IP (Transmission Control Protocol/Internet Protocol). If the host 10 is connected via a LAN to the primary storage apparatus 20, the host 10 requests file-based data input-output by the primary storage apparatus 20 by designating a file name.

If the host 10 is connected via a SAN to the primary storage apparatus 20, the host 10 requests block-based data input-output according to Fibre Channel protocol wherein blocks are data management units of storage areas provided by a plurality of storage devices (disk drives).

If the communication network CN1 is a LAN, the adapter 12 is, for example, a LAN network card. If the communication network CN1 is a SAN, the adapter 12 is a host bus adapter as shown in FIG. 1.

The primary storage apparatus 20 is roughly divided into a storage device unit 30 and a controller unit, the remaining area. The controller unit includes a plurality of channel adapters (CHAs) 21 (21A, 21B), a plurality of disk adapters (DKAs) 22 (22A, 22B), a service processor (SVP) 23, a cache memory 24, a shared memory 25, and a connector 26.

The channel adapter (CHA) 21 is equipped with a microprogram for controlling processing of a command received from the host 10, issuance of a command to the external storage apparatus 40, and data transfer between the host 10 and the external storage apparatus 40.

The CHA 21A has a target port 210A for receiving a write/read command from the host computer 10 and the target port 210A is connected to the adapter 12 for the host 10. On the other hand, the CHA 21B is connected to the external storage apparatus 40 and issues various commands including a write/read command via an initiator port 210B to a target port 41 of the external storage apparatus 40.

CN2 is a SAN connecting the target port 41 of the external storage apparatus 40 and the initiator port 210B of the CHA 21B. An attribute for connection to the external storage apparatus is set to the initiator port 210B. The initial port, to which such an attribute is set, issues commands as an external port to the external storage apparatus. The port to which the external storage apparatus is connected will be hereinafter referred to as the external port. Incidentally, both the channel adapters 21A, 21B are configured as microcomputer systems, each of which is equipped with a microprocessor and a memory.

Since a network address (for example, an IP address or a WWN) is assigned to the channel adapter 21, each channel adapter 21 can act individually as an NAS (Network Attached Storage). If a plurality of hosts 10 exist, the channel adapter may exist for each host so that it can individually receive a request from the host 10.

The disk adapter (DKA) 22 controls transmission of data to, and reception of data from, the storage device unit 30 and is composed of a microcomputer system including a microprocessor and a memory. The DKA 22 has an initiator port 22-1, 22-2 to which the storage devices are connected.

The DKA 22 writes data, which the CHA 21A has received from the host 10, to the storage devices according to a write command from the host 10. On the other hand, the DKA 22 reads data, which has been written to the storage devices, according to a read command and sends it to the host 10. Reading data from, and writing data to, volumes in the external storage apparatus 40 are controlled by the CHA 21B.

The DKA 22 converts a logical address designated by a command to a physical address in the storage devices. The DKA 22 manages a plurality of storage devices according to the RAID.

The service processor (SVP) 23 is a service processor contained in the primary storage apparatus 20 to set and manage the configuration of the primary storage apparatus 20 and is equipped with an SVP program 23-1. The SVP program is software for implementing a storage apparatus maintenance function (such as addition, reduction, and replacement of each of various components and program updates) and managing device control information and has a function that sends a device control information setting instruction received from a management program 10-3 operating on a management PC 10-1 to the microprogram for the CHA 21.

The management PC 10-1 is a PC for a user, which is used by the user of the management program 10-3 to perform the operation and maintenance of storage apparatuses. The management PC 10-1 and the SVP 23 are connected via an external LAN (CN3). The SVP 23 is connected via an internal LAN to the CHAs 21 and the DKAs 22.

The management program 10-3 is software used by the user to manage the device control information about the storage apparatuses. The management program is, for example, Java applet program, which is downloaded from a Web server 23-2 for the SVP to the management PC 10-1 and operates on a Web browser 10-2.

The management program 10-3 for the management PC realizes a GUI for an administrative user to input management information. The setting and management of configuration information about the storage apparatuses from the management program 10-3 to the SVP program 23-1 includes creation of internal volumes and setting of logical paths in the primary storage apparatus 20, as well as creation of volumes and setting of logical paths in the external storage apparatus 40, mapping of volumes in the external storage apparatus to the primary storage apparatus, and management of the mapped volumes.

The cache memory 24 temporarily stores data received from the host computer 10 or read from storage devices 31A, 31B.

The shared memory 25 stores control information about the primary storage apparatus 20 and the external storage apparatus 40. A work area is set to the shared memory 25 and the shared memory 25 stores management tables described later.

The cache memory 24 and the shared memory 25 can be configured as separate memories or a storage area of part of the same memory can be used as a cache area and the other storage area can be used as a control area. Incidentally, the storage device unit 30 may be used as a cache storage area.

The connector 26 is used to connect the channel adapters 21, the disk adapters 22, the SVP 23, the cache memory 24, and the shared memory 25 to each other and is, for example, a high-speed bus such as a very high-speed crossbar switch for data transmission by high-speed switching operation.

The storage device unit 30 includes a plurality of storage devices. An example of the storage devices is, for example, at least one of media such as hard disks, flexible disks, magnetic tapes, semiconductor memories, and optical disks. Different types of disks such as FC (Fibre Channel) disks and SATA (Serial AT Attachment) disks may be mixed in the storage device unit 30.

Each of the reference numerals 31A, 31B shown in the storage device unit 30 represents a logical area (logical volume, which will be hereinafter referred to as the volume for short) set to a real physical memory area in the storage device unit 30.

The reference numeral 32 indicated with a dotted line represents a virtual volume. The virtual volume does not have a physical memory, is mapped to the volume 42 in the external storage apparatus 40, and can be read-accessed or write-accessed from the host 10. The primary storage apparatus 20 can make the host 10 recognize the storage resources for the external storage apparatus 40 as internal storage resources for the primary storage apparatus 20 by means of mapping described later.

The external storage apparatus 40 has almost the same configuration as that of the primary storage apparatus 20. Particularly, the external storage apparatus 40 has a communication port (target port) 41 for connection with the primary storage apparatus 20 via the communication line CN2 (SAN). The reference numeral 42 represents a volume in the external storage apparatus 40 as described above.

Next, the storage configuration of the primary storage apparatus 20 and the external storage apparatus 40 will be explained in detail with reference to FIG. 2. Hosts 10A, 10B, 10C are connected to the primary storage apparatus 20. The reference numeral 202 is a logical path connecting a real volume 31A, virtual volumes 32A, 32B, 32C, and the target ports 210A of the CHAs.

External storage apparatuses 40A, 40B, 40C, 40D are connected respectively to the primary storage apparatus 20. The reference numeral 204 represents a logical path connecting the virtual volume 32A and the external ports 210B connected to the external storage apparatus 40A; the reference numeral 206 represents a logical path connecting the virtual volume 32B and the external ports 210B connected to the external storage apparatus 40B; and the reference numeral 208 represents a logical path connecting the virtual volume 32C and the external ports 210B connected to the external storage apparatus 40C.

Each reference numeral 220A, 220B, 220C, and 220D represents a storage area (PDEV described later) in each external storage apparatus. Volumes 42A, 42B, 42C of each external storage apparatus are mapped to the virtual volumes 32A, 32B, 32C, respectively. Each reference numeral 270A, 270B, 270C shows that the volumes 42A, 42B, 42C of the external storage apparatuses are mapped to the virtual volumes 32A, 32B, 32C, respectively. Also, each reference numeral 222A, 222B, 222C represents a logical path formed between the target ports 41 of the external storage apparatus with the volume.

In order to distinguish between a volume in the primary storage apparatus 20 and a volume in the external storage apparatus, the former volume will be hereinafter referred to as the internal volume and the latter volume will be hereinafter referred to as the external volume. If the term the volume is simply used, it collectively refers to the internal volume and the external volume. If the term the volume is simply used without using the term the virtual volume, this volume indicates a real volume to which a storage area is allocated.

Figure 3:
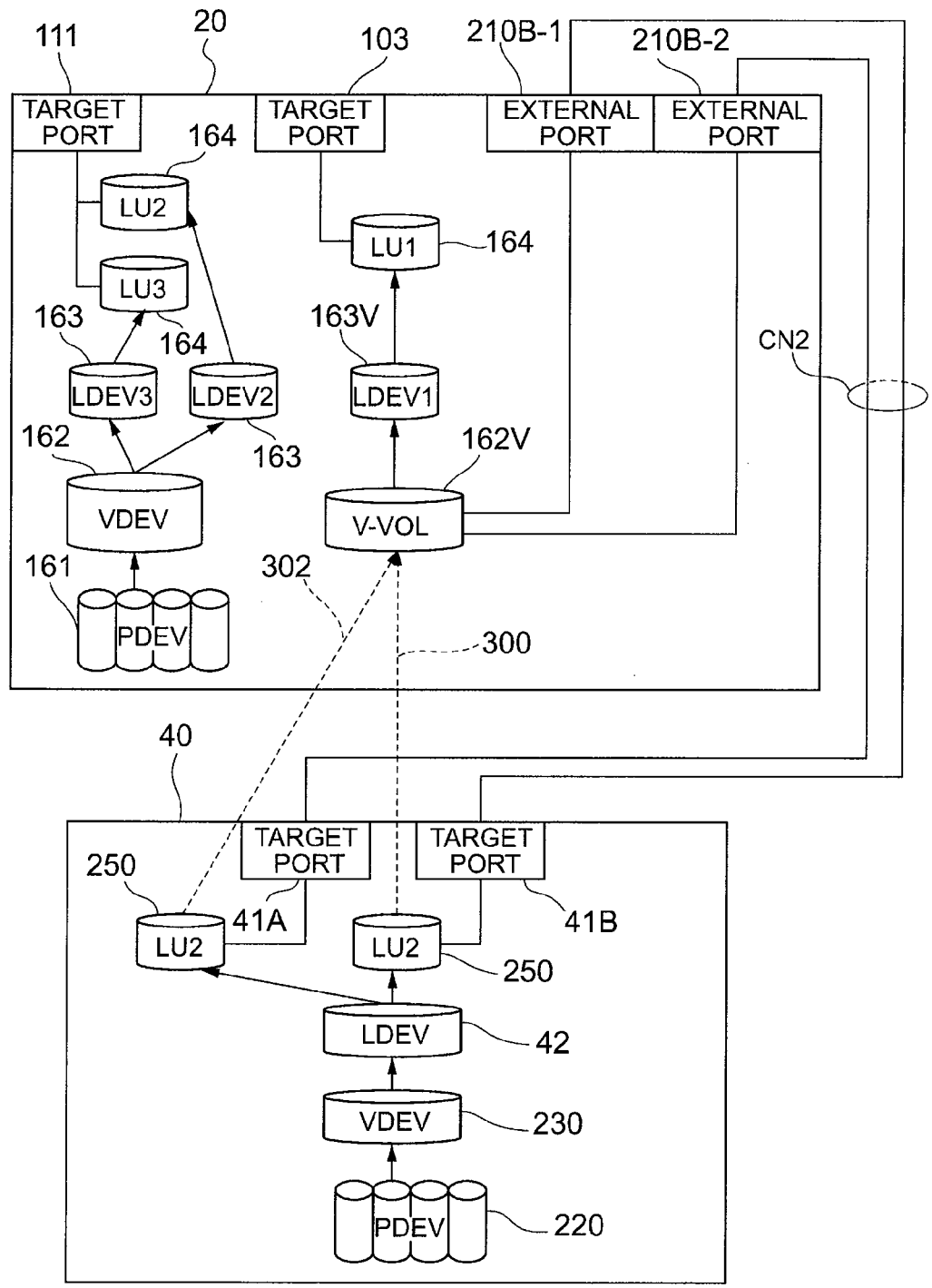
FIG. 3 is a block diagram for explaining the storage configuration of the primary storage apparatus 20 and the external storage apparatus 40 in more detail.

The relationship between the storage configuration of the primary storage apparatus and the storage configuration of the external storage apparatus will be explained in more detail with reference to FIG. 3. Physical storage hierarchy of the primary storage apparatus 20 are constituted from PDEVs (Physical Devices) 161 which are physical disks.

The logical storage hierarchy has a plurality of storage tiers. FIG. 3 shows two tiers. A first logical tier is a VDEV (Virtual Device) 162 and a virtual VDEV treated like the VDEV 162 (hereinafter referred to as the V-VOL) 162V. A second logical tier is an LDEV (Logical Device) 163.

The VDEV 162 is a group of a specified number of PDEVs 161 such as a group of four PDEVs (3D+1P) and a group of eight PDEVs (7D+1P). Storage areas of the respective PDEVs 161 belonging to a group are gathered to form one RAID storage area. This RAID storage area becomes the VDEV 162.

The VDEV 162 is set to a physical storage area. In contrast, the V-VOL 162V is a virtual intermediate storage device to which no physical storage area is allocated. Although the V-VOL 162V is not directly related to a physical storage area, it is an object to be mapped to LUs (Logical Units) 250 of the external storage apparatus 40.

At least one LDEV 163 is set to the VDEV 162. An LDEV corresponds to the aforementioned internal volume. The LDEV 163 is defined and set by, for example, dividing the VDEV 162 by a fixed length. The primary storage apparatus 20 can also set an LDEV1 to the V-VOL162. In this case, the LDEV1 (163V) does not have a storage area and corresponds to the aforementioned virtual volume.

An LDEV3 (163) is mapped to an LU3 (164), an LDEV2 (163) is mapped to an LU2 (164), and the LDEV1 (163V) is set to an LU1 (164), so that the open-type host recognizes the LDEVs 163, 163V as physical disks.

The host accesses a desired LDEV 163, 163V by designating the LUN and logical block address of the LDEV.

The LUs 164 are logical devices that can be recognized as SCSI logical units. The LUs are connected via the target ports to the host. The LU 2 and the LU 3 are connected to a target port 111 and the LU1 is connected to a target port 103. Incidentally, the primary storage apparatus 20 can virtually set the LU size by sequentially connecting a plurality of LDEVs to one LU. This technique is called thin provisioning.

The primary storage apparatus 20 has a plurality of external ports 210B-1, 210B-2. Each external port is connected to a target port 41A, 41B of the external storage apparatus 40. Each external port is connected to the V-VOL162V.

The external storage apparatus 40 includes a PDEV 220, a VDEV 230 which is set to the PDEV 220, and an LDEV 42 which is set to the VDEV 230. The LDEV 42 corresponds to an external volume.

The LDEV 42 is connected to an LU1 (250) and an LU2 (250). Also, each LU1, LU2 (250) is connected to each target port 41A, 41B.

Each LU1, LU 2 of the external storage apparatus 40 is logically connected to the V-VOL (162V) by logical connection between the target ports (41A, 41B), the external ports (210B-1, 210B-2), and the V-VOL (162V). This is called mapping as mentioned earlier.

Figure 2:
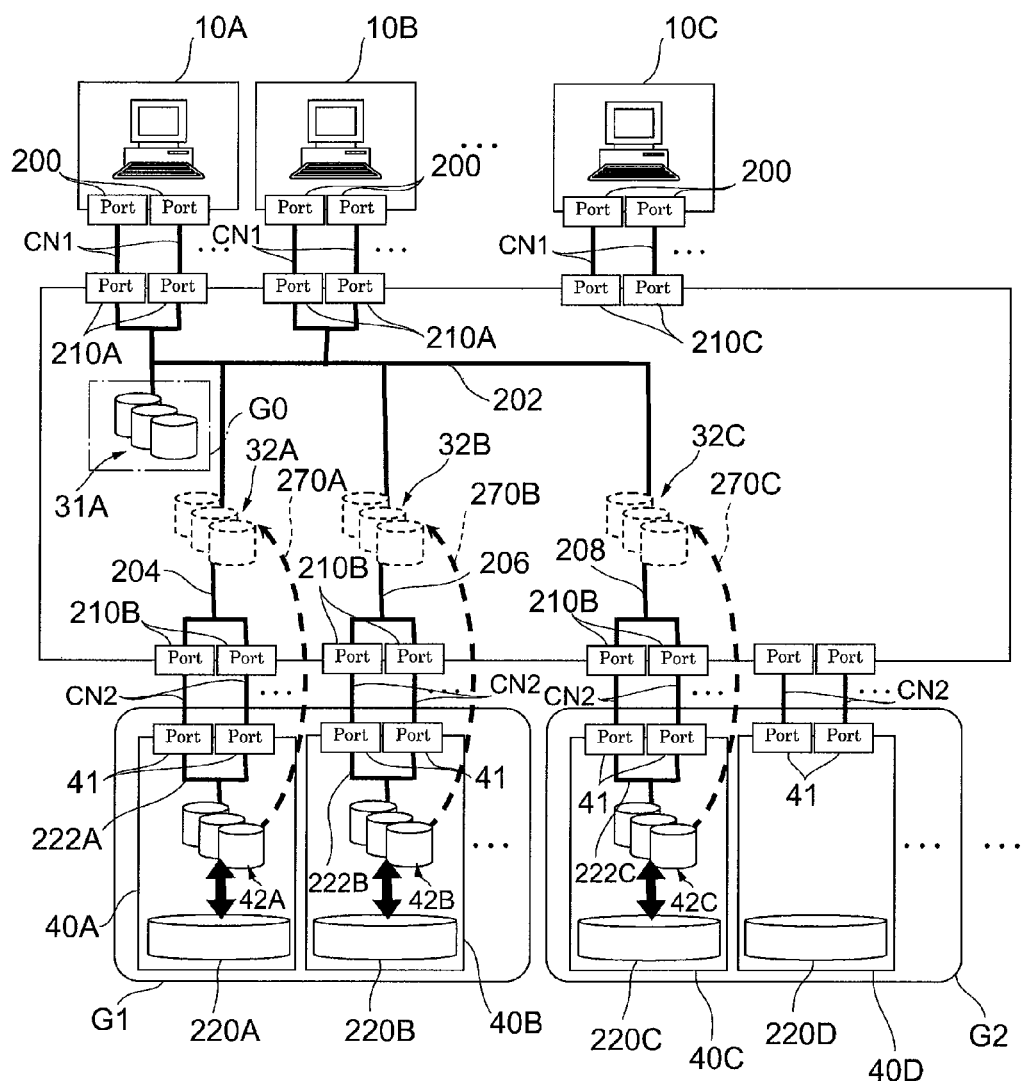
FIG. 2 is a block diagram for explaining the details of the storage configuration of a primary storage apparatus 20 and an external storage apparatus 40.

Therefore, the external volumes are connected to the virtual volumes as shown with the reference numerals 270A, 270B, 270C in FIG. 2 by means of connection information between the external ports of the primary storage apparatus and the target ports of the external storage apparatus and logical path information between the target ports and the external volumes. As a result, write data by write access from the host to the virtual volume is stored in the external volume.

Since the host 10C is not connected to the logical path 202 in the primary storage apparatus 20 in FIG. 2, it cannot access the internal volume 31A or the virtual volumes 32A-32C. The setting of an external volume to the external storage apparatus 40D is not completed.

When a system administrator intends to create a new volume, the management program 23-1 for the SVP 23 classifies and manages the storage resources of the primary storage apparatus 20 and the storage resources of the external storage apparatus according to at least one of a plurality of standards that are not the distinction between the external volume and the internal volume, for example, attributes of the storage resources (at least one of factors such as reliability, read/write processing speed, and access speed), attributes of a storage pool, the types of the storage resources, so that a new volume can be created without requesting the user of the management PC to distinguish between the internal volume or the external volume.

The storage group is a standard or range for reducing user processing for creating an external volume, setting a logical path for the external volume, and mapping the external volume to a virtual volume. The primary storage apparatus identifies the location of a storage device which is an object of management processing, such as a storage device in which a volume is to be created, a storage device from which the a volume is to be deleted, and a storage device from which a volume is to be migrated, by using a storage group without requiring input by the administrative user. The management PC classifies the storage group on the management program 10-3.

FIG. 2 shows an example of group setting. Group 0 (G0) is defined as a storage group that can realize the highest reliability, the highest read/write processing speed, and the highest-speed access to the storage resources; G1 is defined as a storage group whose access performance is lower to that of G0, but whose reliability and processing speed are high; and G2 is defined as a storage group whose reliability and read/write processing speed are inferior to those of G1. The primary storage apparatus 20 falls into G0; the external storage apparatuses (40A, 40B) belonging to a high-end type fall into G1; and the external storage apparatuses (40C, 40D) belonging to a middle range type fall into G2.

Grouping standards for the external storage apparatuses may be decided according to performance of media mounted in the external storage apparatuses. For example, a storage apparatus in which SSD or SAS disks are mounted is classified into a high-order storage group, while a storage apparatus in which SATA disks are mounted is classified into a low-order group. Different storage groups may be set for each medium in the same storage apparatus.

Therefore, if the administrative user selects G0 and demands creation of a new volume by the primary storage apparatus 20, the SVP program 23-1 creates an internal volume 31A and includes it in G0. If the administrative user selects G1 and demands creation of a new volume by the primary storage apparatus 20, the SVP program 23-1 sends a new external volume setting command to the external storage apparatus 40A or 40B and includes the new external volume in G1. If the administrative user selects G2 and demands creation of a new volume by the primary storage apparatus 20, the SVP program 23-1 sends a new external volume setting command to the external storage apparatus 40C or 40D and includes the new volume in G2.

Examples of the purposes for the administrative user to create a new volume include creation of a new volume for storing write data from the host and creation of a new volume in a migration destination storage group in order to migrate volume data between storage groups.

The real volume(s) 31A has attributes of the internal storage resources (such as SAS, FC, and SATA) for the primary storage apparatus, while each virtual volume 32A to 32C has attributes of its storage group.

Figure 4:
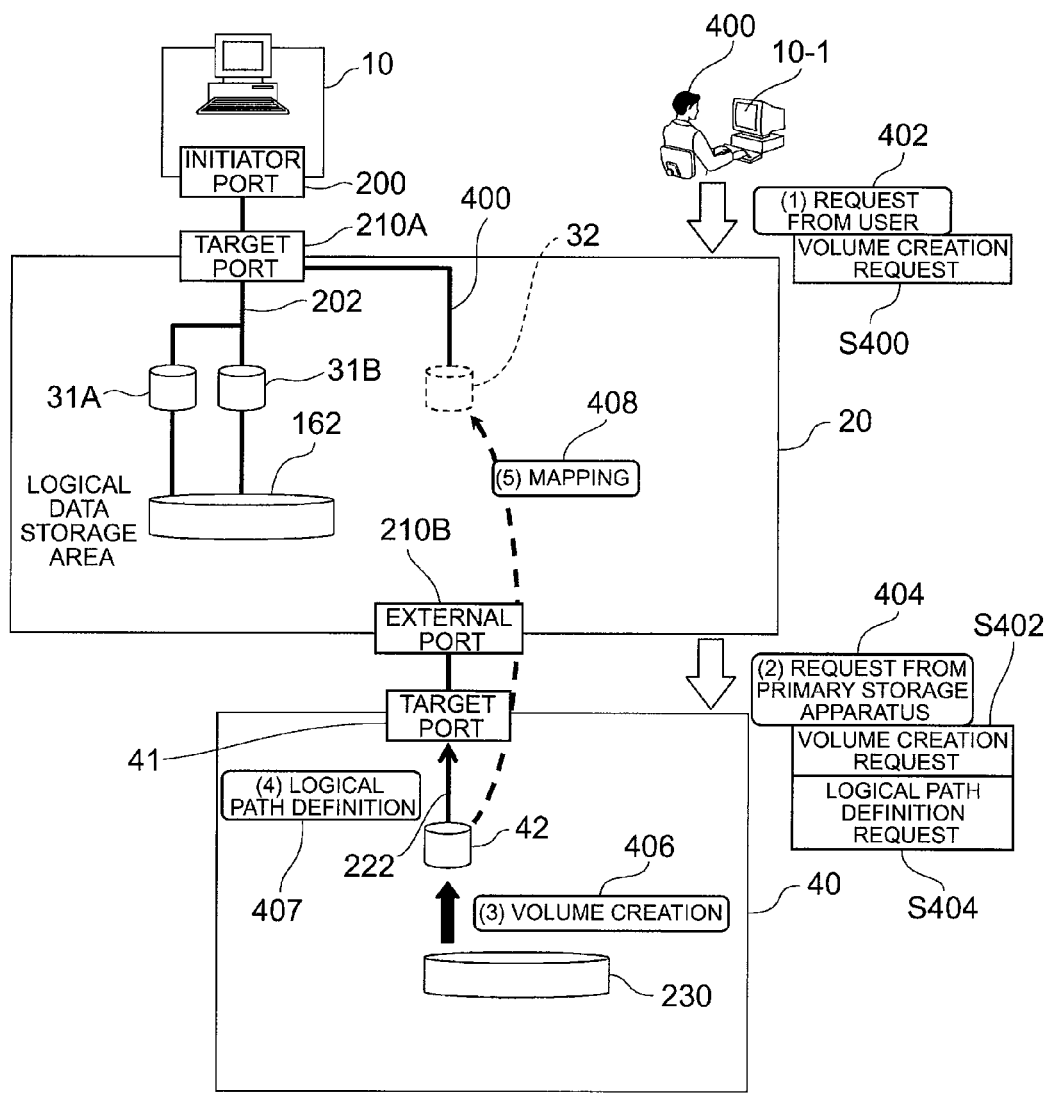
FIG. 4 is a block diagram showing a flow of volume creation in a storage system.

Next, a flow of volume creation in the storage system will be explained with reference to FIG. 4.

(1) Request from User (402)

The administrative user 400 of the management PC 10-1 inputs a volume creation request to the management program 10-3 (S400). The administrative user 400 executes input for volume creation to the management program 10-3, using a GUI. The result of input information is transferred from the SVP program 23-1 to the management program 10-3 and provided to the administrative user via the GUI.

(2) Request from Primary Storage Apparatus 20 to External Storage Apparatus 40 (404)

The SVP program 23-1 judges whether the volume to be created is an internal volume or an external volume, from information about the storage group, which is an object of volume creation, based on the information input by the administrative user.

If the primary storage apparatus 20 determines that the external volume is to be created, the SVP program 23-1 refers to a command for the external storage apparatus, which is stored in the shared memory 25, and sends an external volume creation command from the external port 210B to the target port 41 (S402). Similarly, the SVP program 23-1 sends a logical path definition command for the external volume to the target port (S402).

(3) Creation of External Volume in External Storage Apparatus (406)

(4) Logical Path Definition (407)

If the target port 41 receives the volume creation request and the logical path definition request, the microprogram of the CHA for the external storage apparatus 40 creates an external volume 42 in the VDEV 230 and defines a logical path between the external volume 42 and the target port 41.

(5) Mapping (408)

If the primary storage apparatus 20 receives completion notice of the setting of the external volume 42 and the definition of the logical path 222 from the external storage apparatus 40, it sets definition information about the logical path between the virtual volume 32, the external port 210B, the target port 41, and the LUN of the external volume 42 and registers it in the shared memory 25.

As a result, mapping between the virtual volume 32 and the external volume 42 is completed. Then, the SVP program 23-1 maps a logical path for the virtual volume 32 to the host computer by defining a logical path between the WWN of the host port, the WWN of the target port 210A of the primary storage apparatus, the LU 164, and the virtual volume 32.

Examples of input of the management information by the administrative user 400 includes, besides the creation of a volume, registration of an external storage apparatus to a storage group and registration of a storage group. The SVP program 23-1 provides a management status report to the administrative user by referring to the management tables in the shared memory 25.

Figure 5:
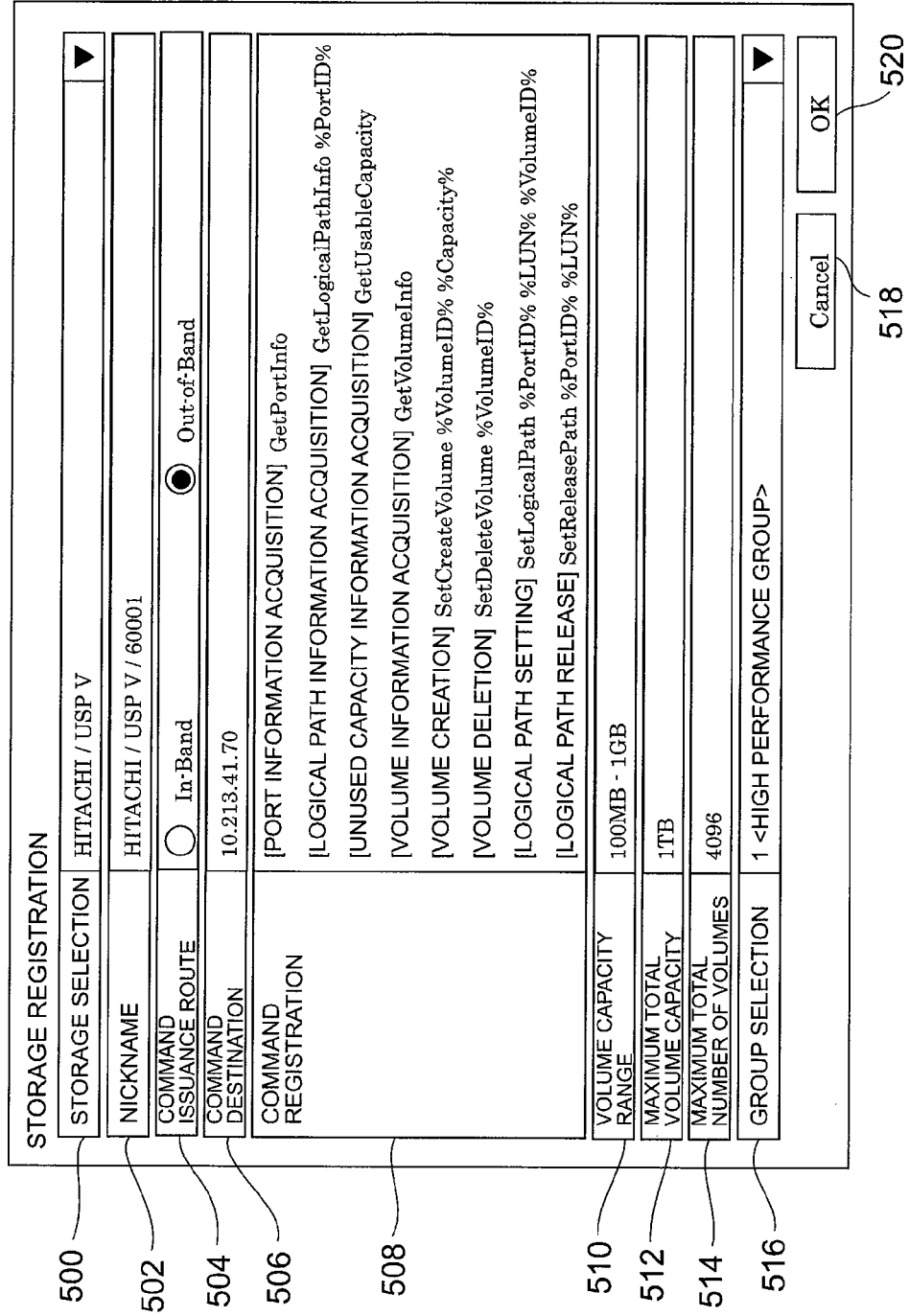
FIG. 5 is an example of an input screen, which is supplied from a management PC to an administrative user, for registering the external storage apparatus 40 in the primary storage apparatus 20.

FIG. 5 is an example of a GUI screen, which is supplied from the management PC to the administrative user, for registering the internal resource of the primary storage apparatus 20 and/or the external storage apparatus 40 in the primary storage apparatus 20. After receiving the information input via the GUI, the SVP program registers it as new information or an update to the management tables in the shared memory 25. The management information in the shared memory 25 is read by the SVP program 23-1 and provided to the GUI.

Next, the reference numeral 500 is an input area in which the name of an external storage apparatus is selected or set. The reference numeral 502 represents an area for registering a nickname of the external storage apparatus. The reference numeral 504 is an area for setting an issuance route for a command from the primary storage apparatus to the external storage apparatus. There are an in-band route and an out-of-band route as the command issuance routes.

The reference numeral 506 represents an input area for identification information about a command destination. If the command issuance route is out-of-band, an IP address is input as shown in the drawing; and if the command issuance route is in-band, a WWN is input.

The reference numeral 508 is an area for registering command information for the external storage apparatus. The administrative user either registers the command information by referring to individual information about the external storage apparatus or inputs the command information by utilizing information provided as a template.

There are a plurality of types of commands, for example: a command for obtaining report information about the external storage apparatus; a command for obtaining logical path information; a command for obtaining the unused capacity of the external storage apparatus; a command for obtaining volume information about the external apparatus; a command for creating a volume in the external storage apparatus; a command for deleting the created volume; a command for setting a logical path; and a command for releasing the logical path.

The reference numeral 510 represents an area for defining the capacity range (minimum capacity and maximum capacity) of a volume that can be created by the administrative user. The reference numeral 512 represents an area for defining the maximum total volume capacity. The reference numeral 514 represents an area for defining the maximum number of volumes. The reference numeral 516 represents an area for having the administrative user select a storage group in which the selected storage apparatus (500) is to be included.

The selection of the storage group is implemented by the administrative user selecting a specific storage group from among storage group information registered in the shared memory 25. The administrative user selects the ID of the specific storage group from among a plurality of storage groups pulled up. The storage group ID may be a nickname (such as high performance group) that symbolically shows an attribute of the storage group.

The reference numeral 518 represents a button to cancel the input content and the reference numeral 520 represents a button to finalize the input content.

Figure 6:
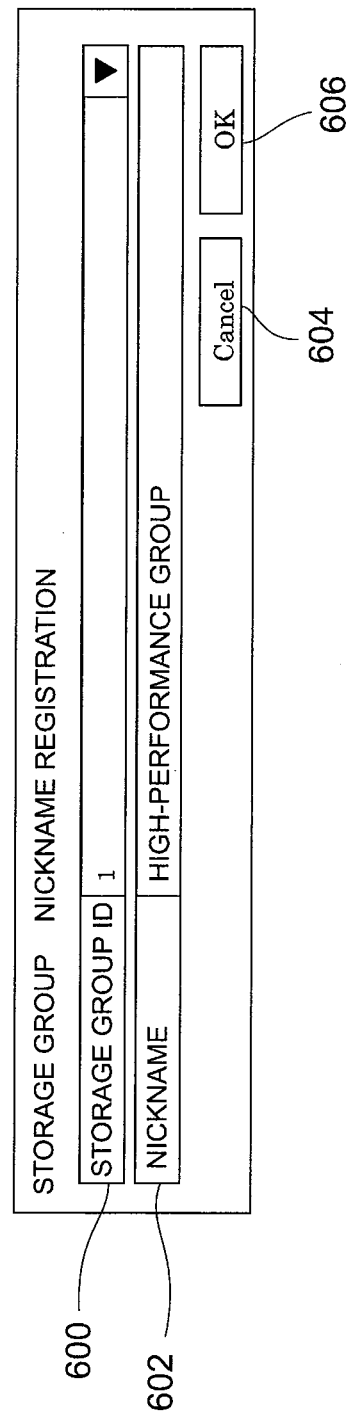
FIG. 6 is an example of an input screen for registering a storage group and its nickname.

FIG. 6 is an input screen for registering a storage group and a nickname. The registration content is stored in the shared memory 25. The reference numeral 600 represents an area for the administrative user to decide the storage group ID. The reference numeral 602 is an area for the administrative user to set the nickname. The reference numeral 604 represents a button to cancel the input content and the reference numeral 606 represents a button to finalize the input content.

Figure 7:
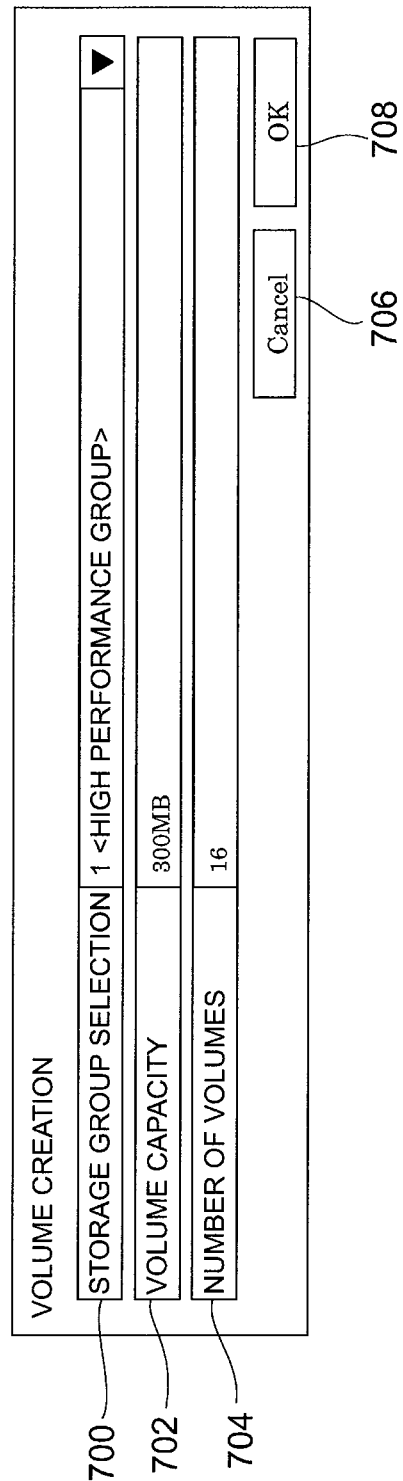
FIG. 7 is an information input screen for the administrative user to create a volume.

FIG. 7 is an information input screen for the administrative user to create a volume. The reference numeral 700 represents an area for selecting a storage group. The reference numeral 702 represents an area for inputting the capacity of the volume to be created. The reference numeral 704 is an area for inputting the number of volumes to be created. The reference numeral 706 represents a button to cancel the input content and the reference numeral 708 represents a button to finalize the input content.

Figure 8:
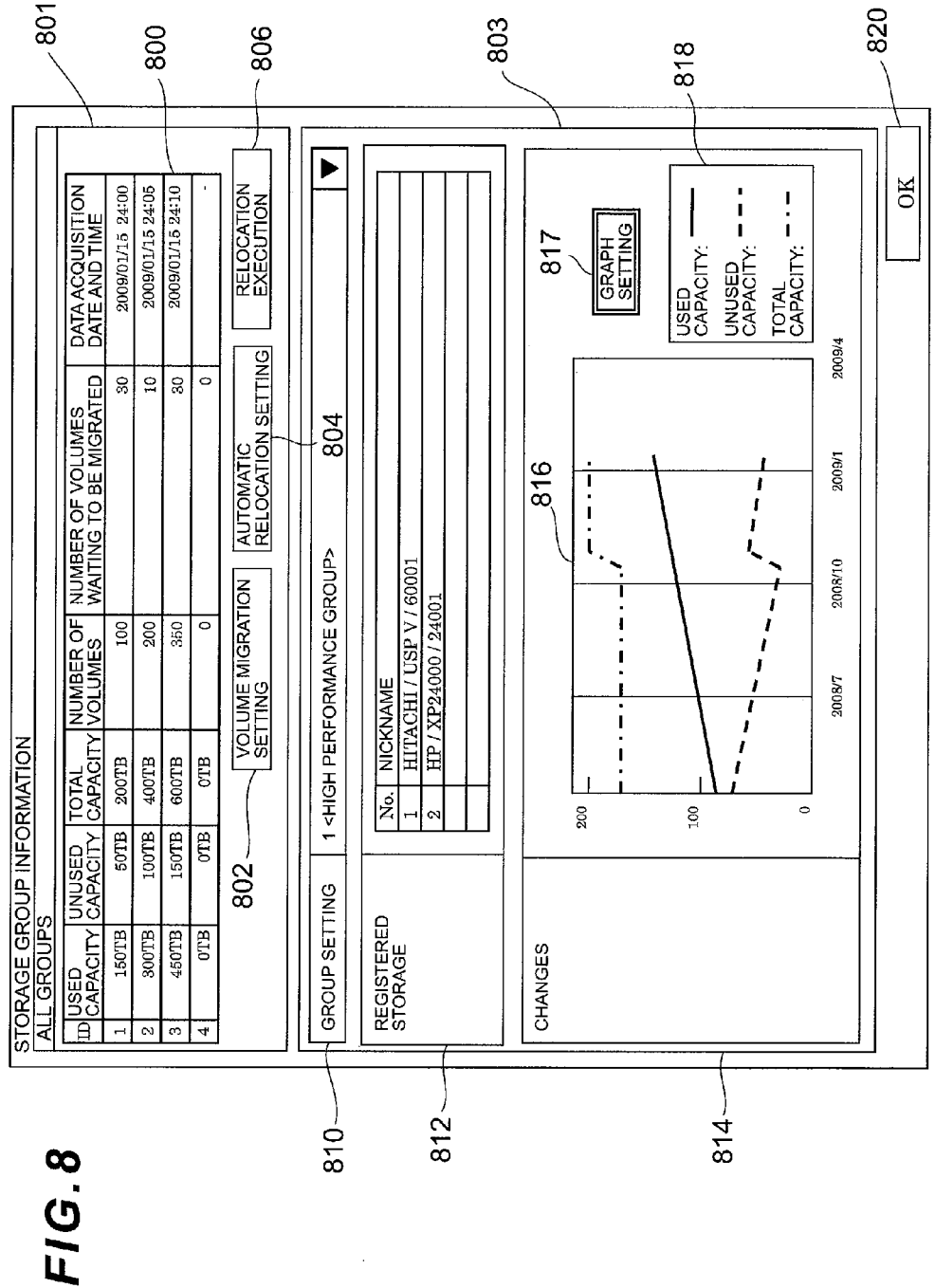
FIG. 8 is an example of a report screen of storage group information.

FIG. 8 is an example of a report screen for the storage group information. The SVP program 23-1 refers to the management information in the shared memory 25 and transfers it to the management program 10-3 for the management PC 10-1. The management program 10-3 creates screen information from the management information and supplies it to the GUI.

The report screen includes an overall display area 801 for all storage groups and an individual display area 803 for the selected storage group. The display area 801 includes an overall information table 800 about all the storage groups and a plurality of buttons 802, 804, 806.

The overall information table 800 includes, for each storage group ID, display areas for the following pieces of information: the unused capacity, the total capacity, the number of logical volumes existing in the relevant storage group of the designated storage group ID, the number of volumes waiting to be migrated to another storage group, and a date and time of acquisition of the storage group information.

The volume migration setting button 802 is used to set processing for migrating data of a volume(s) belonging to the storage group to a volume(s) in another storage group to the management program 23-1 for the SVP.

The automatic relocation setting button 804 is used to set automatic execution, irrespective of an event which triggers the administrative user to input, of migration of volume data between different storage groups according to a policy selected by the administrative user. Migration of volume data between storage groups according to a policy is called relocation processing.

One of policies is the concept of data life cycle management. Specifically speaking, a storage apparatus stores data, which are being used, in online storage devices; stores data after the elapse of a certain amount of time in nearline storage devices; and stores archive data in archive devices. A relocation processing program executes relocation by extracting a volume, which needs to be relocated, according to a policy or by specifying the volume by means of input by the administrative user.

It is only necessary to set a storage group to which the relevant data should be migrated, in order to execute the relocation processing. The management program 23-1 creates a new volume in the migration destination storage group and migrates data from a migration source volume. The migration source volume on which the relocation processing should be executed is a volume waiting to be migrated; and the number of such volumes is the number of volumes waiting to be migrated.

The automatic relocation setting button 804 is used to set automatic relocation of a volume(s) waiting to be migrated. If the management program receives input to this button, it starts the automatic relocation processing program; and as triggered by an event where, for example, the number of volumes waiting to be migrated or the total capacity of a plurality of volumes waiting to be migrated exceeds a specified reference value.

On the other hand, the relocation execution button 806 is used for input as a trigger to execute relocation on the volume(s) waiting to be migrated.

A group selection area 810 in the individual display area 803 displays the storage group ID and nickname selected by the administrative user. A registered storage area 812 displays an external storage apparatus name or a primary storage apparatus name registered in the storage group selected in the group selection area.

A changes area 814 displays time changes of capacity information about the storage group in the group selection area 810. The capacity information includes the used capacity, the unused capacity, and the total capacity. The changes area 814 shows that values of the storage capacity information increased immediately after 2008/10 because a new external storage apparatus was added to the primary storage apparatus at that time and, therefore, the capacity of the storage group 1<high performance group> increased. The reference numeral 817 represents a button to set, for example, a display form of a graph 816 and the reference numeral 818 represents an area for displaying remark information about the graph 816. The reference numeral 820 represents a confirmation button of report information.

Figure 9:
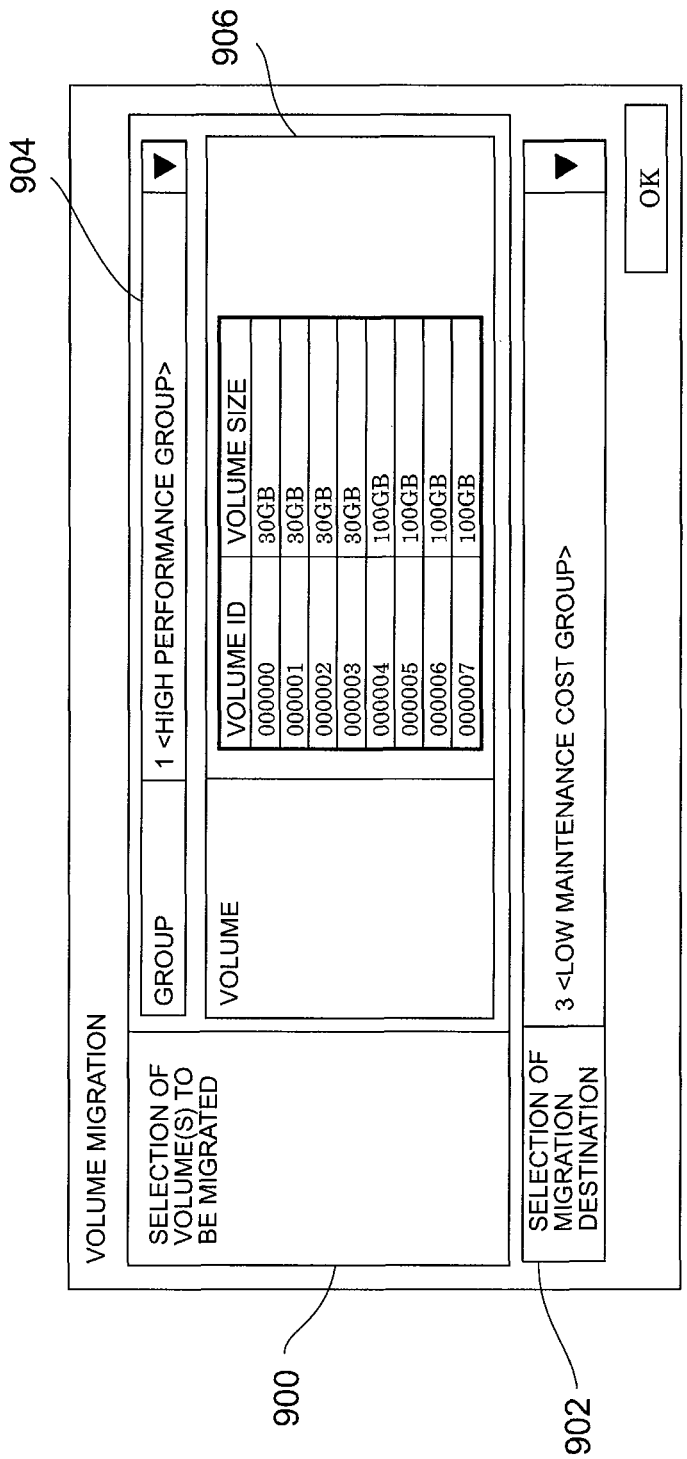
FIG. 9 is an example of an input screen for volume relocation processing.

FIG. 9 is an input screen for the relocation processing. The reference numeral 900 represents a migration source volume selection area for deciding a migration source volume to which the relocation processing should be applied. This selection area includes an area 904 for selecting a migration source storage group 904 and an area 906 for selecting the ID of the migration source volume belonging to the migration source storage group. The reference numeral 902 represents an area for selecting a migration destination storage group to which data of the migration source volume is to be migrated.

Figure 10:
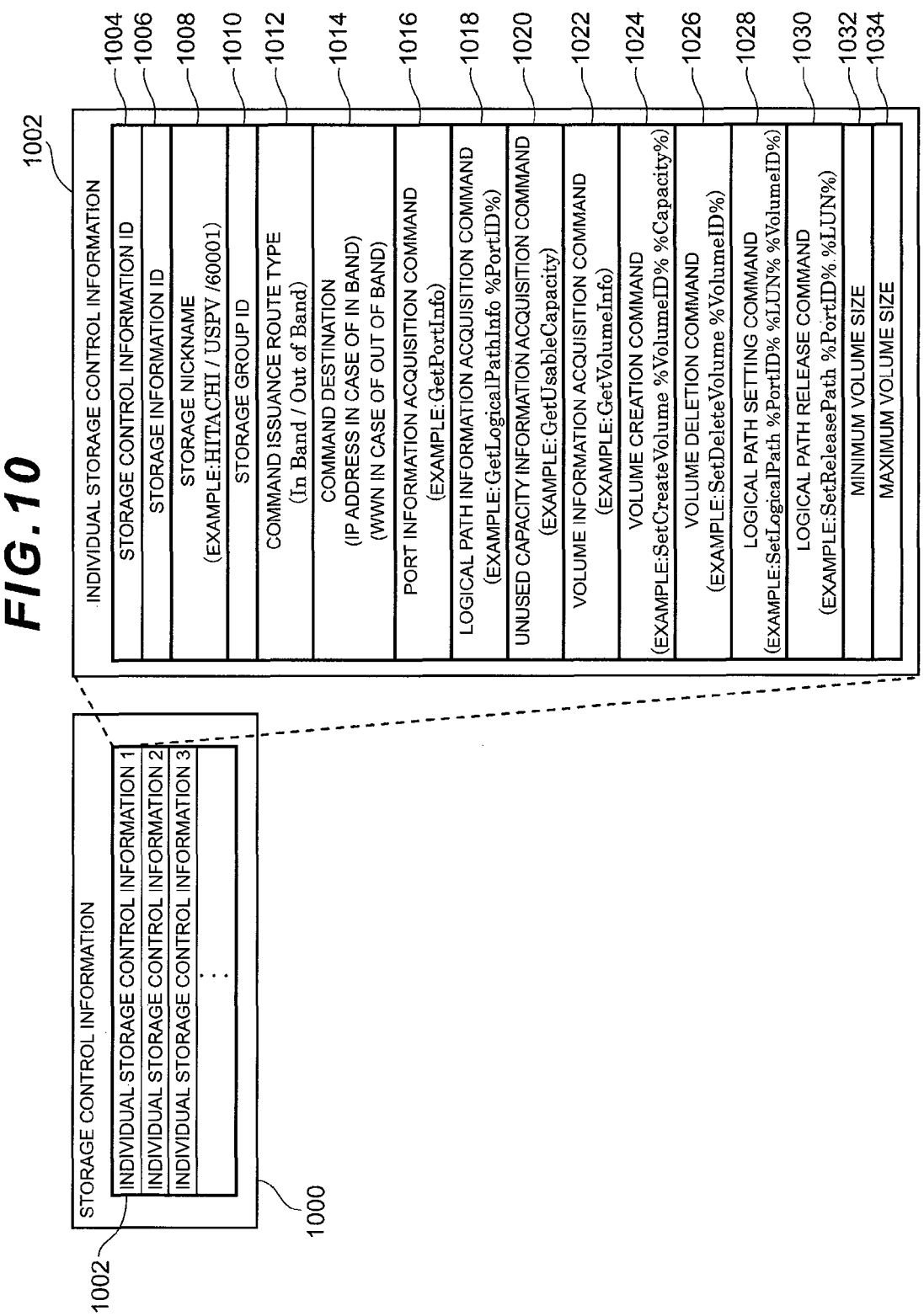
FIG. 10 is an example of a storage control information table.

Next, a plurality of pieces of management information stored in the shared memory 25 will be explained. FIG. 10 is a storage control information table 1000 and includes a plurality of pieces of individual information 1002. Each individual information table 1002 includes: an area 1004 for registering a storage control ID that is set for each piece of individual information; an area 1006 for registering an ID set to the external storage apparatus; an area 1008 for registering a nickname of the storage apparatus; a storage group ID area 1010; a command issuance route type area 1012; a command destination area 1014; an area 1016 for registering a port information acquisition command for the external storage apparatus; an area 1018 for registering a logical path information acquisition command for the external storage apparatus; an area 1020 for registering an unused capacity information acquisition command for the external storage apparatus; an area 1024 for registering a volume acquisition command for the external storage apparatus; an area 1026 for registering a volume deletion command for the external storage apparatus; an area 1028 for registering a logical path setting command for the external storage apparatus; an area 1030 for registering a logical path release command; an area 1032 for registering the minimum volume size that can be created in the external storage apparatus; and an area 1034 for registering the maximum volume size. The SVP management program 23-1 registers input information, which is input to the screen in FIG. 5, in the individual storage control information table 1002.

FIG. 11 is a storage information template table 1100. If the administrative user selects a vendor name and a storage information ID, which is set to each device name, via the GUI, the management program 23-1 reads the management information in the shared memory 25 and supplies default control information which is characteristic of the selected storage apparatus (individual storage information) to the GUI.

The reference numeral 1102 in FIG. 11 represents an example of an individual storage information table. The reference numeral 1006A is an area of vendor information about the external storage apparatus with the storage information ID1006 and the reference numeral 1006B represents a device name area for the external storage apparatus. The reference numeral 1042 represents an area for the minimum volume capacity of the external storage apparatus; the reference numeral 1044 represents an area for the maximum volume capacity; the reference numeral 1046 represents an area for the maximum total volume capacity; and the reference numeral 1048 represents an area for the maximum number of volumes.

The administrative user can simplify information input to the storage registration screen (FIG. 5) by using the individual storage information. When input to the storage registration screen is completed, the SVP management program 23-1 registers all the pieces of input information in the individual storage control information table.

Figure 12:
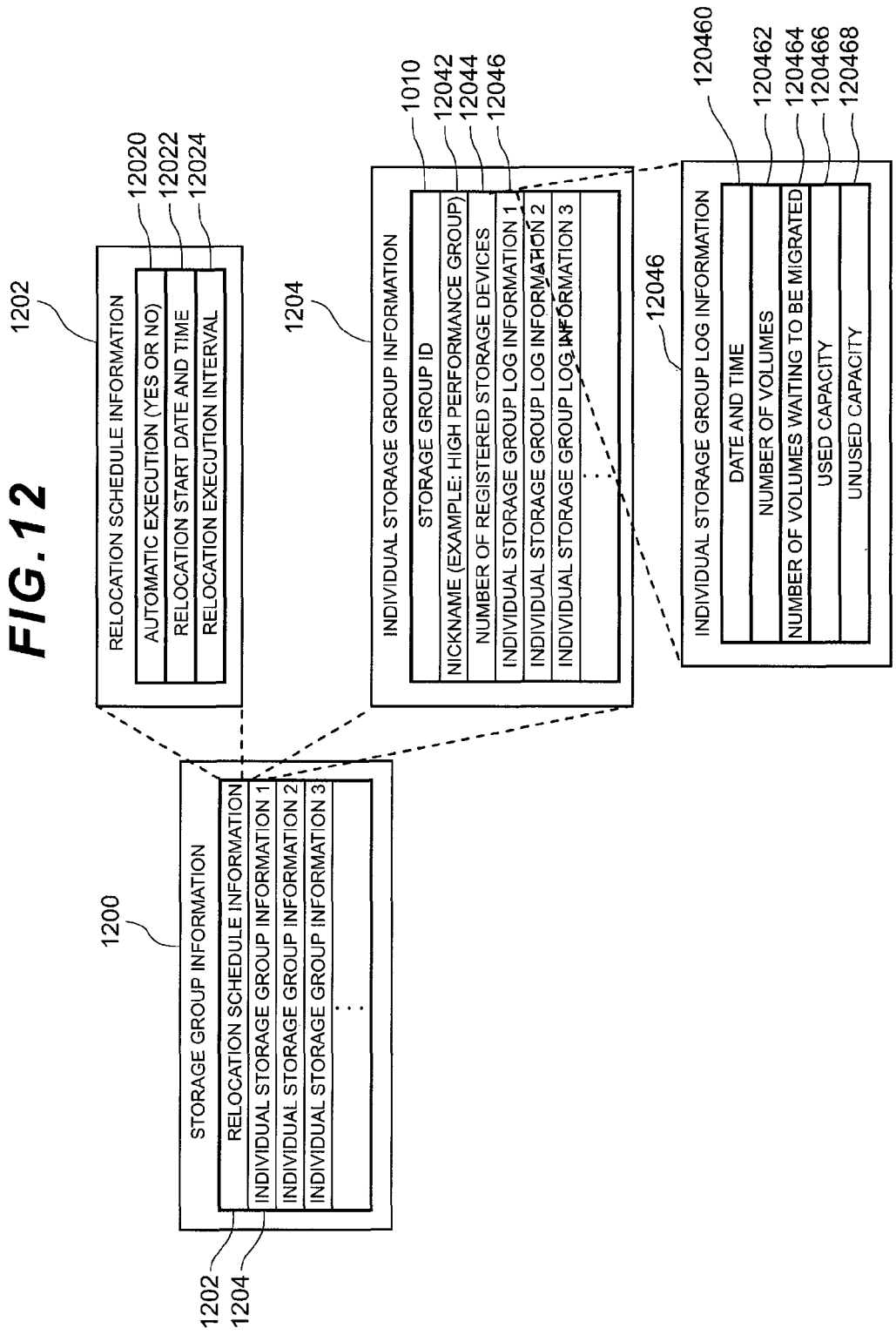
FIG. 12 is an example of a storage group management information table.

FIG. 12 is an example of a storage group management information table 1200. The storage group management information is based on input information, which has been input by the administrative user, and includes relocation schedule information 1202 and individual storage group information 1204.

The relocation schedule information 1202 includes information 12020 indicating whether the automatic execution setting for relocation, that is, migration of volume data between storage groups exists or not, information about a relocation start date and time 12022, and information about relocation execution interval 12024.

The individual storage group information 1204 includes the storage group ID 1010, a storage apparatus nickname 12042, the number of storage apparatuses registered in the storage group 12044, and storage group log information 12046.

The storage group log information 12046 includes a log information acquisition date and time 120460, the number of volumes belonging to the storage group 120462, the number of volumes waiting to be migrated 120464, the used capacity 120466, and the unused capacity 120468.

The SVP program 23-1 extracts necessary information for the report screen (FIG. 8) by referring to the storage group information in the shared memory 25 and then provides the extracted information to the GUI for the management PC 10-1.

Figure 13:
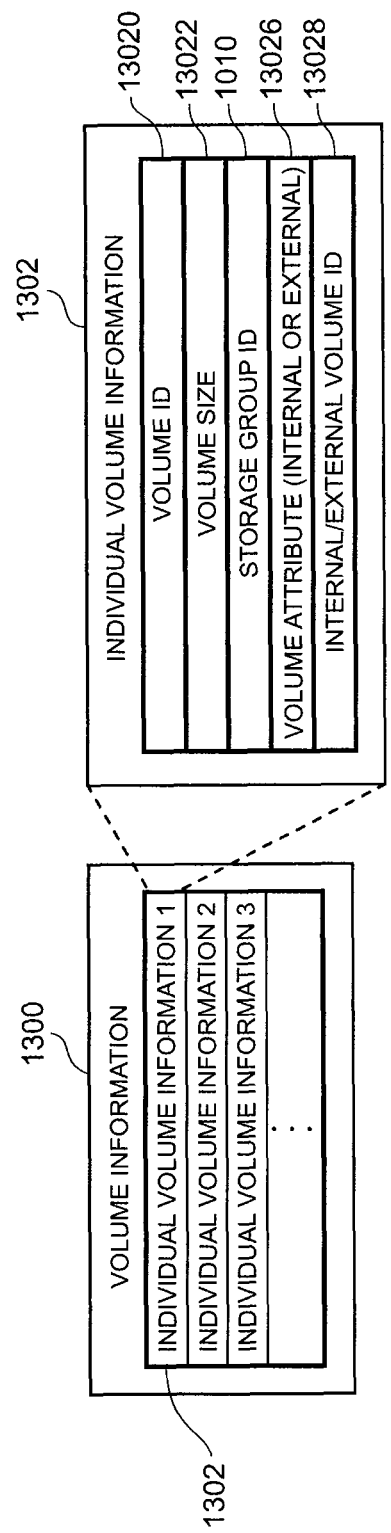
FIG. 13 is an example of a storage group volume information management table.

FIG. 13 is an example of a storage group volume information management table 1300. Volume information is constituted from a plurality of pieces of individual volume information 1302. Each individual volume information includes a volume ID 13020, volume size 13022, the storage group ID 1010 of a storage group to which the relevant volume belongs, an attribute 13026 indicating whether the relevant volume is an internal volume or an external volume, and a volume ID 13028 of either an internal volume in the primary storage apparatus or an external volume in the external storage apparatus.

Every time volume creation information is input, the management program 23-1 for the SVP decides the volume ID; further judges, according to the storage group ID of the storage group in which the relevant volume is to be created, whether the relevant volume is an internal volume or an external volume; and registers the judgment result and the input information in the volume information table 1300.

Figure 14:
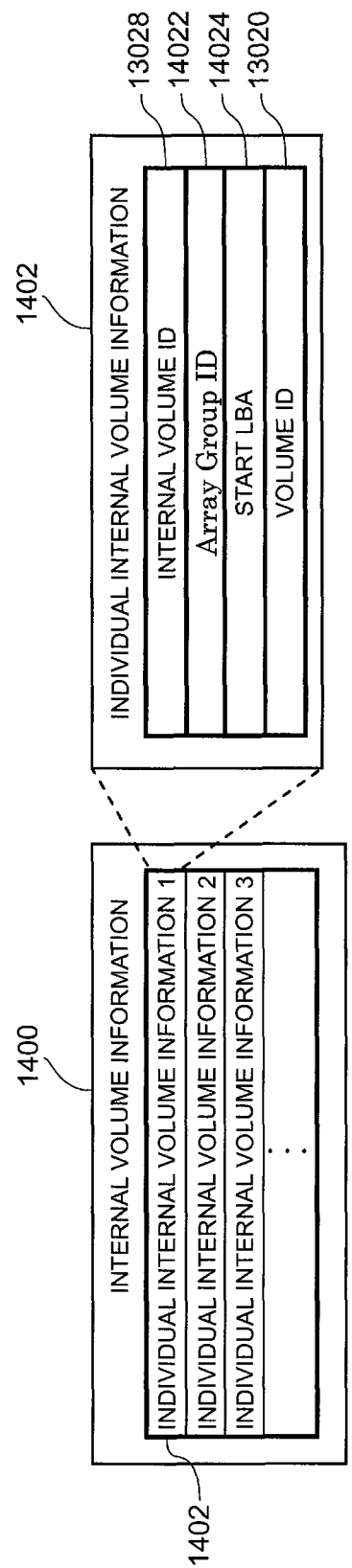
FIG. 14 is an example of an internal volume management information table.

FIG. 14 is an internal volume management information table. The internal volume management information table 1400 is constituted from a plurality of pieces of individual internal volume information 1402. This individual information includes an internal volume ID 13028, an array group (VDEV) ID 14022, and logical block address information (start LBA) 14024 indicating from which address of logical addresses of the array group the relevant internal volume area starts.

If the SVP program 23-1 determines that a volume creation request from the administrative user is issued to the storage resources of the primary storage apparatus 20, the SVP program 23-1 creates an internal volume according to an internal volume creation program and registers information about the internal volume in the individual internal volume information area.

Figure 15:
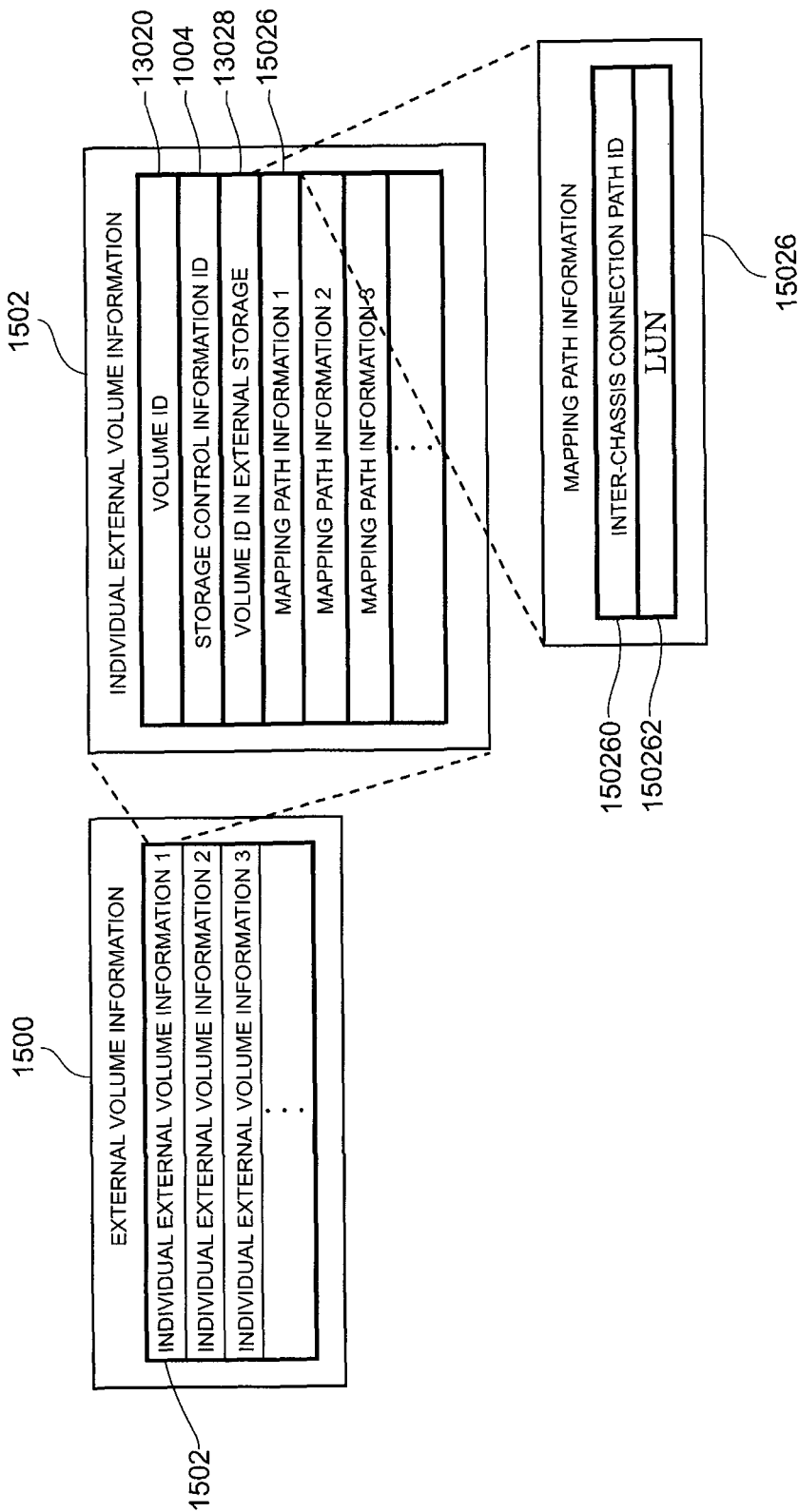
FIG. 15 is an example of the external volume management information table.

FIG. 15 is an external volume management information table 1500. The external volume management information table is constituted from a plurality of pieces of individual external volume information 1502. This individual information includes an external volume ID 15020, the storage control information ID 1004 (FIG. 10) of an external storage apparatus to which the relevant external volume belongs, a volume ID 13028 in the external storage apparatus, and mapping path information 15028.

The mapping path information includes inter-chassis connection path information between the primary storage apparatus 20 and the external storage apparatus 40, that is, an inter-chassis connection path ID 150260 between the external port 210B (FIG. 1) of the primary storage apparatus 20 and the target port 41 of the external storage apparatus, and an LUN 150262 of the external volume. The primary storage apparatus 20 and the external storage apparatus distinguish and manage connection paths between the external ports and the target ports according to the inter-chassis connection path ID.

Figure 16:
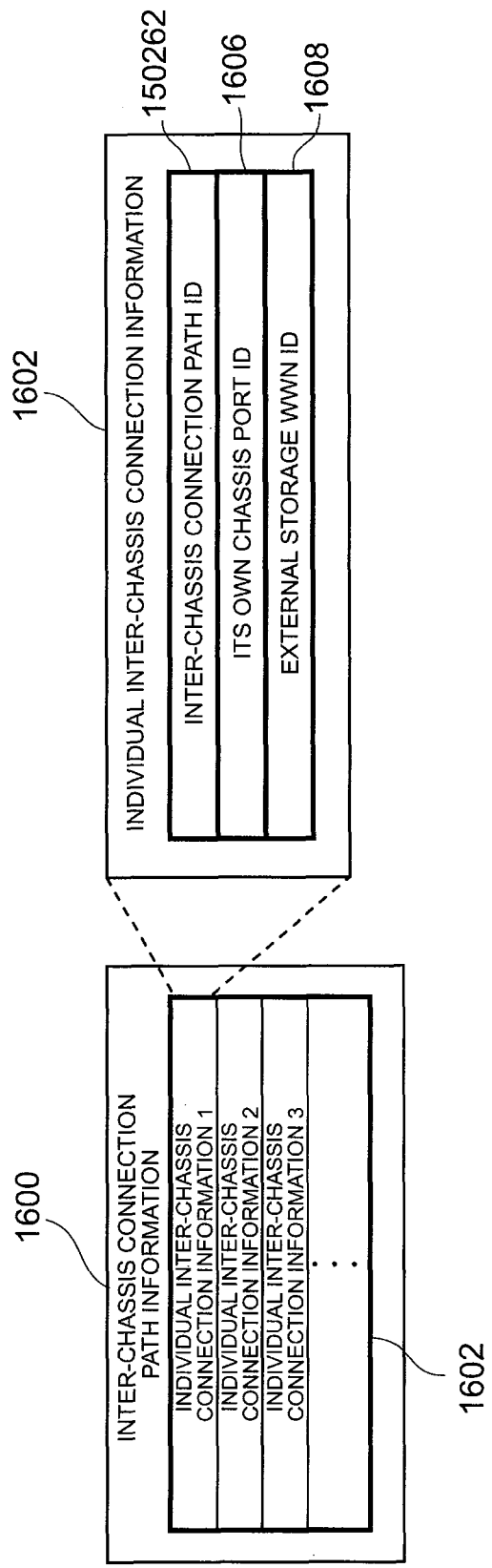
FIG. 16 is an example of an inter-chassis connection path information table.

FIG. 16 is an inter-chassis connection path information table 1600. Individual inter-chassis connection path information includes an inter-chassis connection path ID 150262, an external port ID 1606 of the external port of the primary storage apparatus (its own chassis), and the WWN 1608 identification information about the target port of the external storage apparatus.

Figure 17:
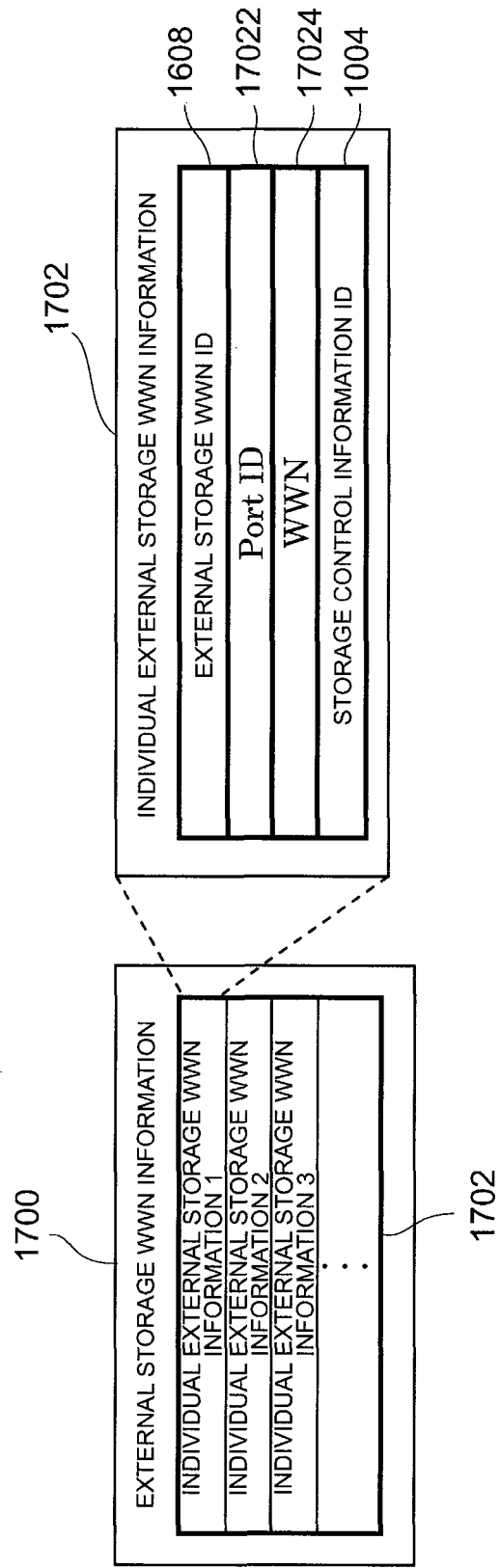
FIG. 17 is an example of a WWN identification information table for the external storage apparatus.

As shown in FIG. 17, individual information about the target port WWN identification information 1700 includes an external storage apparatus (target port) WWN ID 1608, the port ID 17022 of the target port, the WWN 17024 of the target port, and a storage control information ID 1004 of the external storage apparatus to which the target port belongs.

The SVP program 23-1 outputs a volume information acquisition command from the external port to the external storage apparatus, extracts the individual inter-chassis connection path information based on response information from the external storage apparatus in response to the command, and registers it in the individual inter-chassis connection path information management table 1602 and an individual external storage WWN information table 1702.

Figure 18:
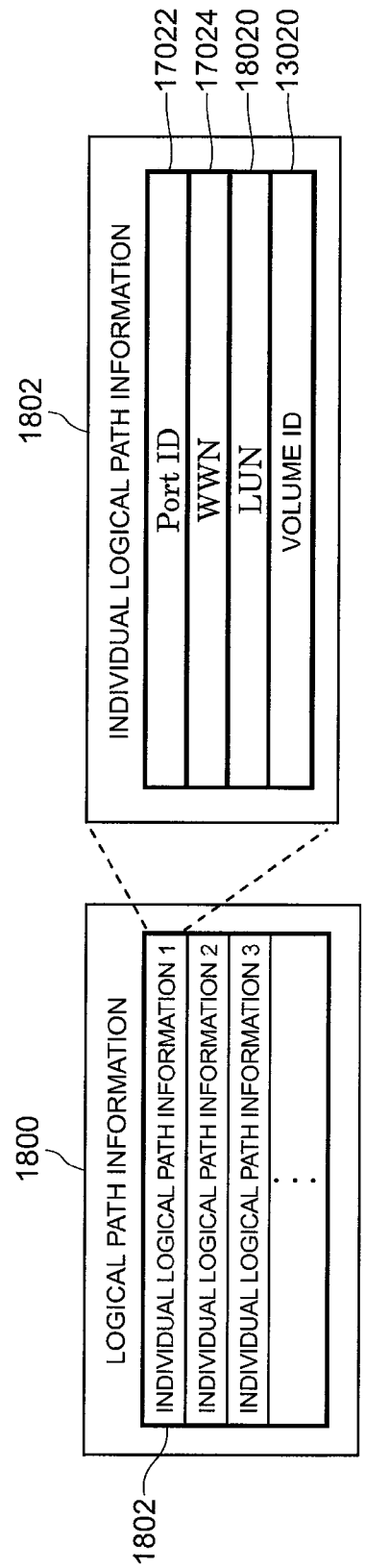
FIG. 18 is an example of a table for managing logical path information for the external storage apparatus.

FIG. 18 is an example of a table 1800 for managing logical path information about the external storage apparatus. Each piece of individual logical path information 1802 includes the ID 17022 of the target port 41 of the external storage apparatus, the WWN 17024 of the target port, an LUN 18020 of the external volume to be connected to the target port, and the external volume ID 13020.

The SVP program 23-1 registers the response information, which has been received from the external storage apparatus in response to the volume information acquisition command 1022, in the logical path information table 1800.

Next, parameters relating to a command sent from the management program for the primary storage apparatus to the external storage apparatus will be explained. If a request for, for example, creation of an external volume is made by the administrative user, the SVP program 23-1 extracts or creates parameters based on the information input by the administrative user and the information stored in the shared memory 25, then generates or selects a command, and sends the command to the external storage apparatus.

Figure 19:
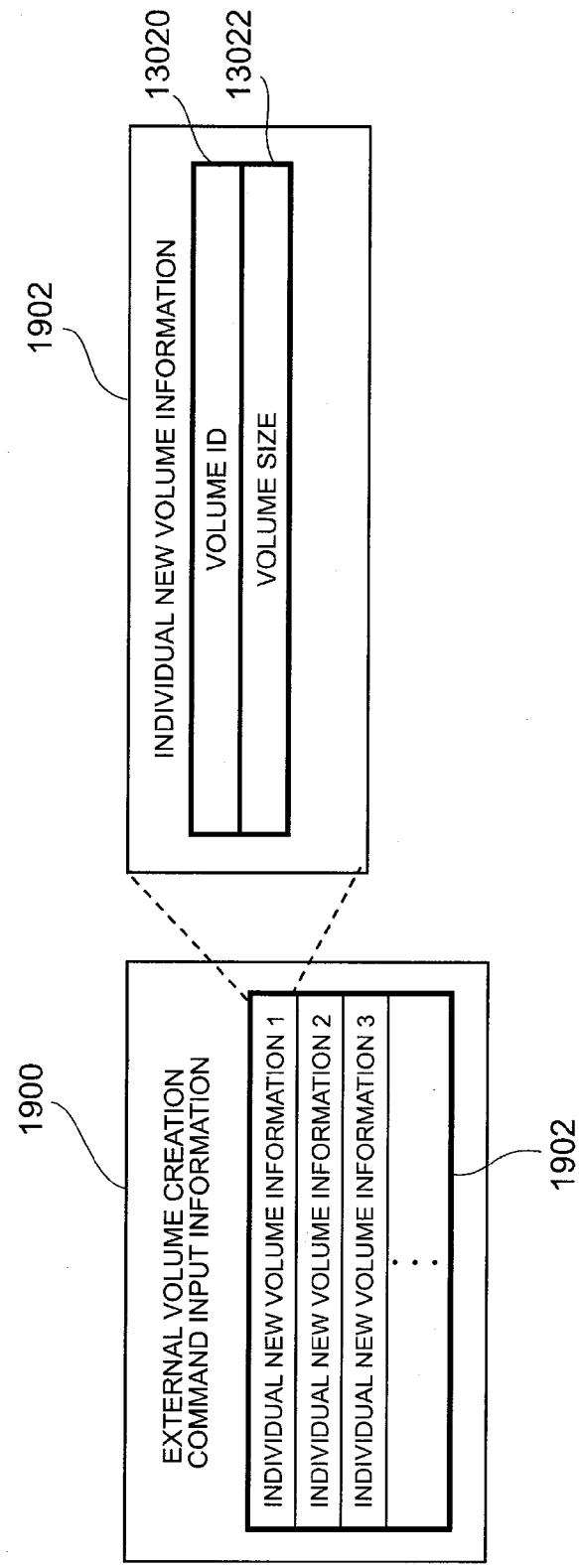
FIG. 19 is an example of an input information table necessary for a command to create a new volume.

FIG. 19 is an input information table 1900 required for a command to create a new volume. An individual new volume information table 1902 includes the volume ID 13020 and the volume size 13022.

Figure 20:
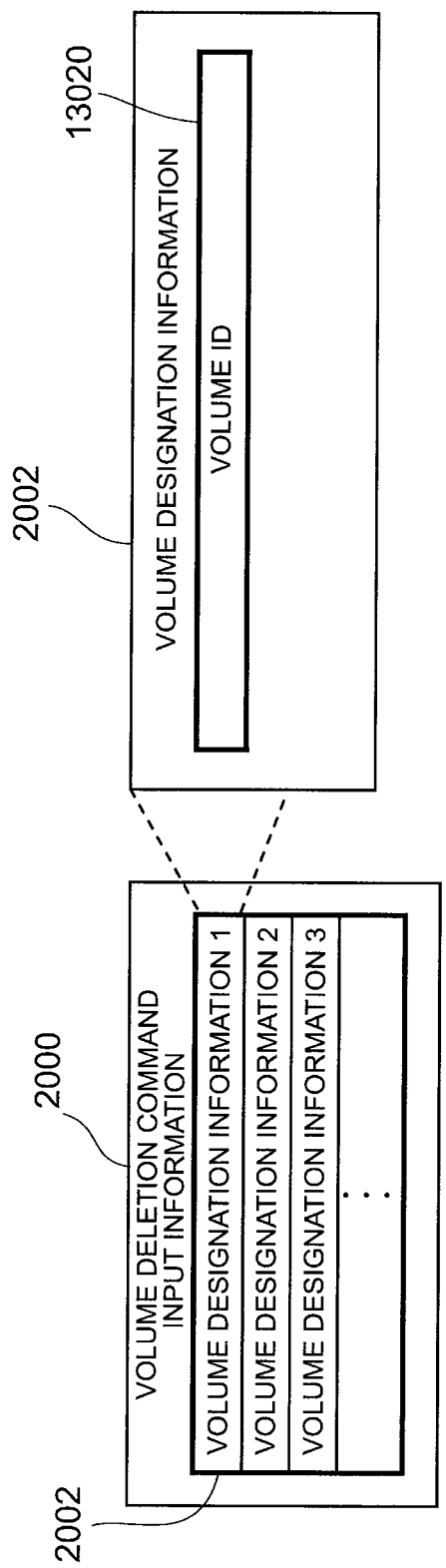
FIG. 20 is an example of an input information table necessary for a volume deletion command.

FIG. 20 is an input information table for a volume deletion command 1024 and designated information 2002 for each volume to be deleted includes the volume ID 13020.

Figure 21:
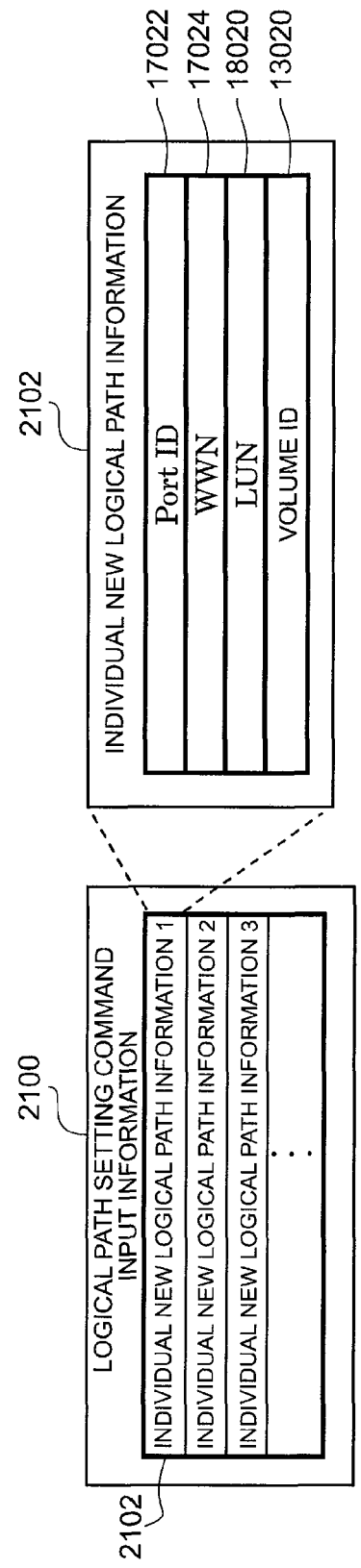
FIG. 21 is an example of an input information table necessary for a logical path setting command.

FIG. 21 is an input information table 2100 necessary for a logical path setting command 1028 and an individual new logical path information table 2102 includes the port ID 17022, the WWN 17024, the LUN 18020, and the volume ID 13020.

Figure 22:
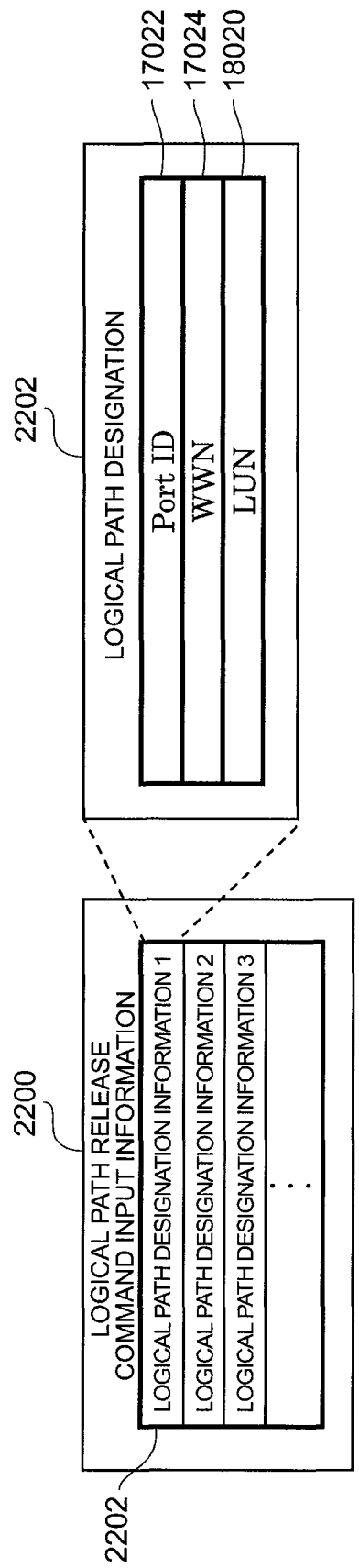
FIG. 22 is an example of an input information table for a logical path release command.

FIG. 22 is an input information table 2200 for a logical path release command 1030 and each piece of logical path designation information 2202 includes the port ID 17022, the WWN 17024, and the LUN 18020.

Figure 23:
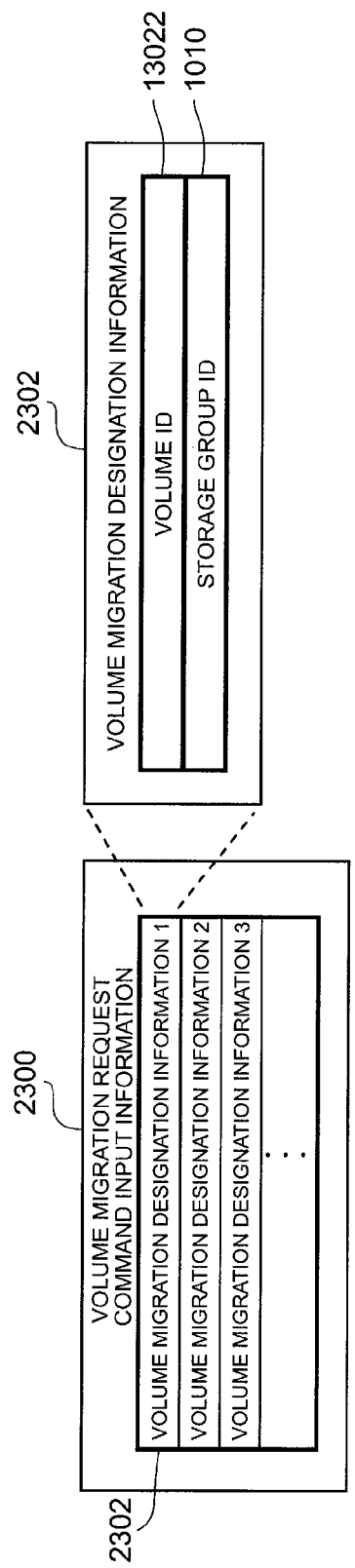
FIG. 23 is an example of an input information table for a volume migration command.

FIG. 23 is an input information table 2300 for a volume migration command to the primary storage apparatus and each piece of volume migration designation information 2302 includes a migration source volume ID 13022 and a migration object storage group ID 1010.

Next, details of the SVP programs will be explained. The controller (not shown in the drawing) for the SVP executes at least one or two programs from among a plurality of programs belonging to the management program and executes various management processing on the external storage apparatus.

Incidentally, the microprogram for the CHA 21, instead of the SVP programs, may execute the management processing. In this case, a storage management program is mounted in the host 10.

Figure 24:
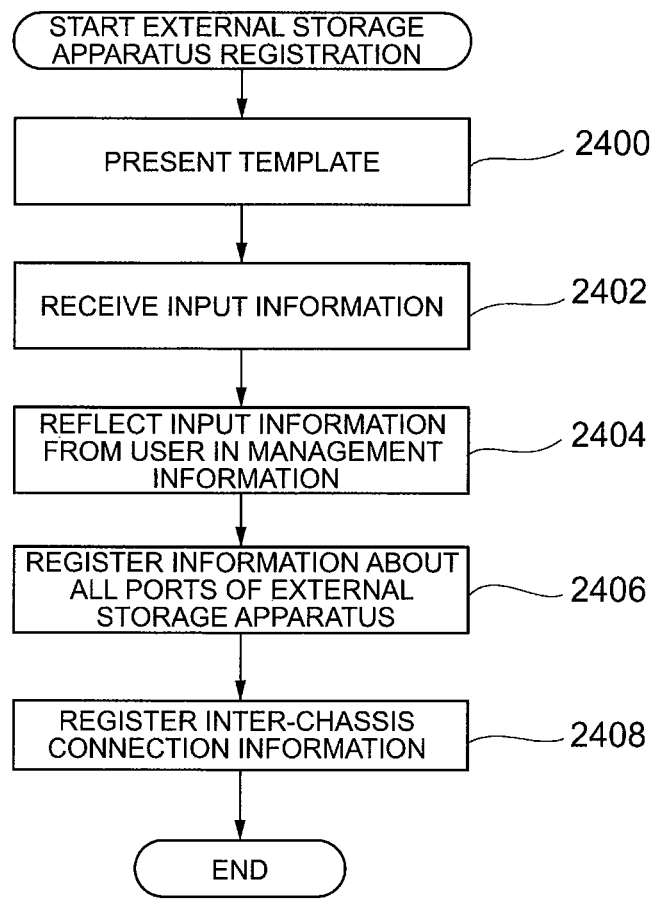
FIG. 24 is an example of a flowchart of a program for registering an external storage apparatus in a primary storage apparatus.

FIG. 24 shows a program for registering the external storage apparatus in the primary storage apparatus. The SVP 23 executes the program, thereby registering various management and control information about the external storage apparatus 40 in the shared memory 25.

If the SVP receives an external storage apparatus registration request from the management PC 10-1, it refers to the management information in the shared memory 25 and provides the template information (FIG. 11) according to the request to the GUI (2400).

If the SVP receives the input information input to the input screen by the administrative user (2402), it registers the input information in the storage control information table 1000 (FIG. 10) and the storage group information table 1200 (FIG. 12) and then increments the number of registered storage devices 1204 (FIG. 12) by one in step 2404 (2404).

Next, the SVP issues a port information acquisition command 1016 to the external storage apparatus 40 based on the command issuance route type (1012) and the command destination (1014) registered in the storage control information table (FIG. 10), extracts all the pieces of port information about the external storage apparatus from the response information, and registers the extracted information together with the storage control information ID (1004) of the external storage apparatus in the individual external storage WWN information table 1702 (FIG. 17) (2406).

Next, the SVP sends a port information acquisition command 1016, via the main microprogram for the CHA 21B (FIG. 1) having the external port, from the external port 210B through the target port 41 of the external storage apparatus 40 to the main microprogram for the external storage apparatus and executes search for the WWN of the target port 41.

If the SVP refers to the external storage WWN information table 1700(FIG. 17) based on the information obtained by the above search and successfully obtains the matching WWN information 17024, it registers the port ID of the external port 210B of the primary storage apparatus and the WWN ID 1608 of the external storage apparatus in the individual inter-chassis connection path information table 1602 (2408).

As a result, the SVP completes registration of the external storage apparatus in the primary storage apparatus and registration of the connection path between the primary storage apparatus and the external storage apparatus.

Figure 25:
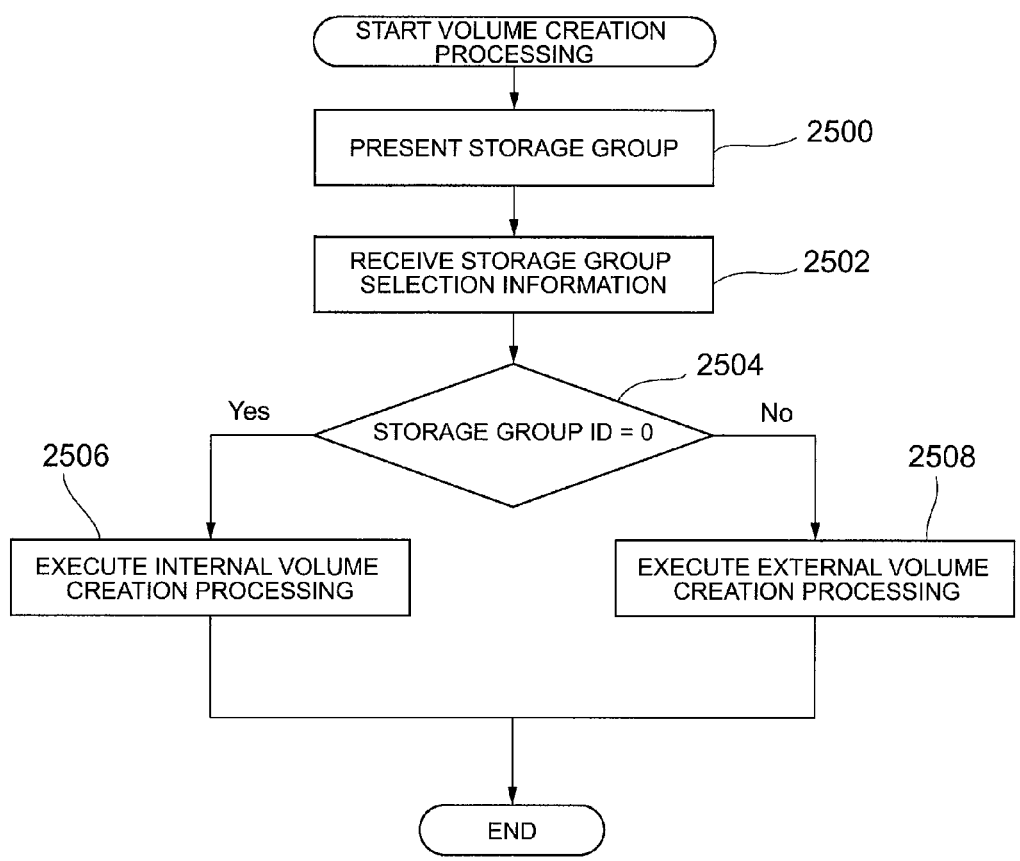
FIG. 25 is an example of a flowchart illustrating volume creation processing.

FIG. 25 is a flowchart illustrating volume creation processing. After receiving a volume creation request from the management PC, the SVP searches the individual storage group information 1002 in the storage control information table 1000 (FIG. 10) and provides information about a candidate storage group, in which a volume can be created, to the management program for the management PC (2500).

If the SVP receives the storage group ID selection information about the object storage group, in which a volume is to be created, from the management PC 10-1 (2502), the SVP judges whether the storage group ID is 0 or not (2504), that is, whether the object storage group in which a volume is to be created belongs to the primary storage apparatus or the external storage apparatus. If the ID is 0, the SVP searches for an array group (VDEV) which can satisfy the volume capacity (FIG. 7: 702) designated by the administrative user; creates an internal volume in the VDEV; registers individual volume information about the created internal volume in the individual volume information table 1302 (FIG. 13); and registers the individual internal volume information in the individual internal volume information table 1402 (FIG. 14) (2506).

If the storage group ID is a value other than 0, the SVP executes external volume creation processing (2508).

Figure 26:
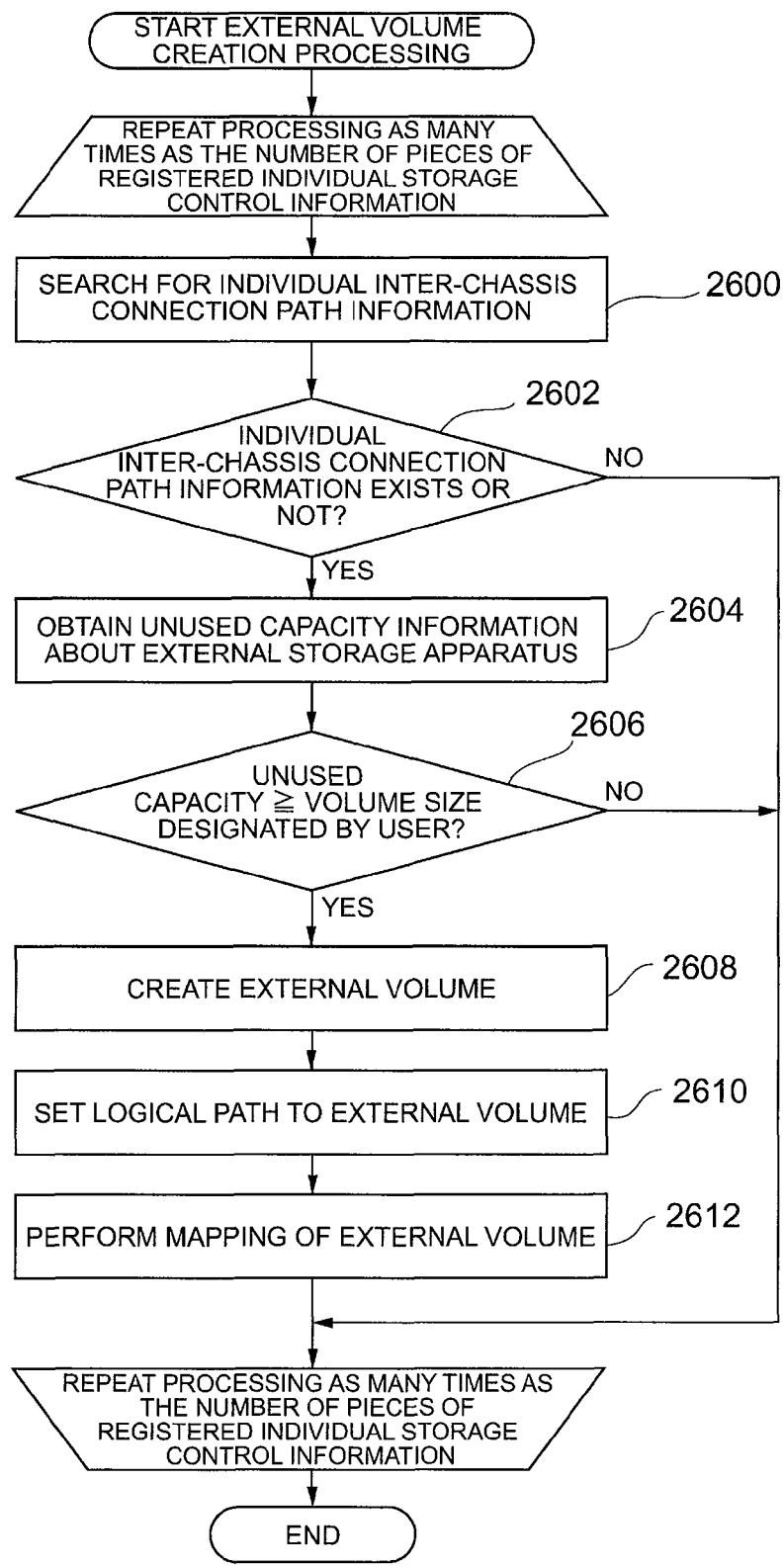
FIG. 26 is an example of a flowchart illustrating external volume creation processing.

FIG. 26 is a flowchart illustrating the external volume creation processing and the SVP executes step 2600 and subsequent steps by sequentially referring to the pieces of the individual storage control information 1002 in descending order, which are registered in the storage control information table1000.

Firstly, the SVP searches for the individual storage control information 1002 having the same ID (1010: FIG. 10) as that of the storage group ID (700: FIG. 7) input by the administrative user.

Next, the SVP finds the storage control information ID (1004: FIG. 10) of the specified individual storage control information and searches for the individual external storage WWN information 1702 (FIG. 17), in which the ID corresponding with the above-described storage control information ID is registered, by referring to the external storage WWN information table 1700.

The SVP then searches for the individual inter-chassis connection path information 1602 (FIG. 16), which corresponds with the external storage WWN ID (1608) of the individual external storage WWN information found by the above search, by referring to the inter-chassis connection path information table 1600 (2600).

If the SVP judges whether the individual inter-chassis connection path information exists or not (2602) and fails to find the individual inter-chassis connection path information, it means that the external storage apparatus belonging to the input storage pool ID is not connected to the primary storage apparatus, so that the SVP returns an error to the program for the management PC and terminates the processing in this flowchart.

If the SVP successfully finds the individual inter-chassis connection path information by the search, it means that the external storage apparatus is connected to the primary storage apparatus. Accordingly, the SVP refers to the storage control information table 1000 (FIG. 10) in the shared memory 25. The SVP specifies the individual information 1002 (FIG. 10), to which the storage group ID (700: FIG. 7) input by the administrative user is added, about the external storage apparatus connected to the primary storage apparatus.

Next, the SVP outputs an unused capacity information acquisition command 1020 to the microprogram for the external storage apparatus via the microprogram for the CHA 21B having the external port 210B connected to the external storage apparatus in accordance with the command issuance route type 1012 and the command destination 1014 registered in the specified individual information.

Subsequently, the SVP obtains the unused capacity from response information to the unused capacity information acquisition command (2604) and registers it in the individual log information table 1204 (FIG. 12) for the object storage group in which a volume is to be created.

The SVP refers to the individual storage group log information table 1204 and compares the volume size (702: FIG. 7) designated by the administrative user with the unused capacity (120468: FIG. 12) in the latest log information about the object storage group. If the unused capacity is less than the volume size, the SVP determines that a volume cannot be created; and then terminates the processing in this flowchart (2606).

On the other hand, if it is determined in step 2606 that the unused capacity is equal to or more than the volume size designated by the administrative user, the SVP refers to the individual information table 1002 (FIG. 10) about the external storage apparatus, which is stored in the storage control information table 1000, reads a volume creation command 1026, and sends the volume creation command to the external storage apparatus. After receiving this command, the CHA for the external storage apparatus creates an external volume by processing by the main microprogram (2608).

In this way, the storage management mechanism for the primary storage apparatus can process the creation of an external volume for the administrative user by issuing a request to the primary storage apparatus in the same manner as the creation of an internal volume.

Furthermore, the administrative user of the primary storage apparatus can create an external volume and set a logical path for the external volume without being required to directly access the external storage apparatus.

Furthermore, if the administrative user requests the creation of a volume in a storage group having the attribute desired by the administrative user without being aware of the difference between an internal volume and an external volume and in consideration of the difference in the attributes of the storage groups, the management program for the primary storage apparatus sets the volume to either the primary storage apparatus or the external storage apparatus.

The SVP registers the external volume information, which has been obtained via the microprogram for the CHA 21B, in the individual volume information table 1302 (FIG. 13) and the individual external volume information table (1502: FIG. 15).

Incidentally, the SVP may obtain information about an unused volume(s) in the external storage apparatus by using a volume information acquisition command 1022 instead of the volume creation program 1024 (FIG. 10), and register management information, including the ID(s), about the unused external volume(s) in the individual volume information table 1302 as new registration or update registration. Incidentally, the same procedure will be taken if a volume to be created is an internal volume.

Next, the SVP program sends a logical path setting command 1028 to the external storage apparatus. After receiving this command, the microprogram for the external storage apparatus sets a new LUN and sends it to the SVP.

After receiving the new LUN, the SVP registers the logical path information in the individual logical path information table 1802 (FIG. 18) (2610).

Incidentally, the SVP may search for an unused LUN in the external storage apparatus, using the logical path information acquisition command 1018 (FIG. 10); and register it as the logical path information in the individual logical path information table.

Next, the SVP can map the external volume 42 (FIG. 1) to the virtual volume 32 in the primary storage apparatus by allocating the external volume 42 (FIG. 3), to which the logical path is set, to the V-VOL (162V) in the primary storage apparatus (300, 302) (2612).

Next, the SVP executes step 2600 and subsequent steps for the next individual storage control information registered in the storage control table 1000. The same procedure will be taken if it is determined in step 2602 the inter-chassis path information does not exist.

Incidentally, if the SVP fails to set a volume to the storage group ID, which is set by the administrative user, even by sequentially referring to the pieces of individual storage control information, the administrative user performs at least one of the following actions: registering a new external storage apparatus to the storage group ID; relocating a volume in the external storage apparatus, which is registered in the storage group ID, to another storage group ID; adding the capacity to the external storage apparatus; and selecting another storage group ID.

If a plurality of external storage apparatuses are registered in the storage group ID input by the administrative user, the SVP creates a volume in at least one of the external storage apparatuses. When doing so, the SVP program may set the priority order to the storage apparatuses to be used by, for example, prioritizing an external storage apparatus with a large unused capacity.

Figure 27:
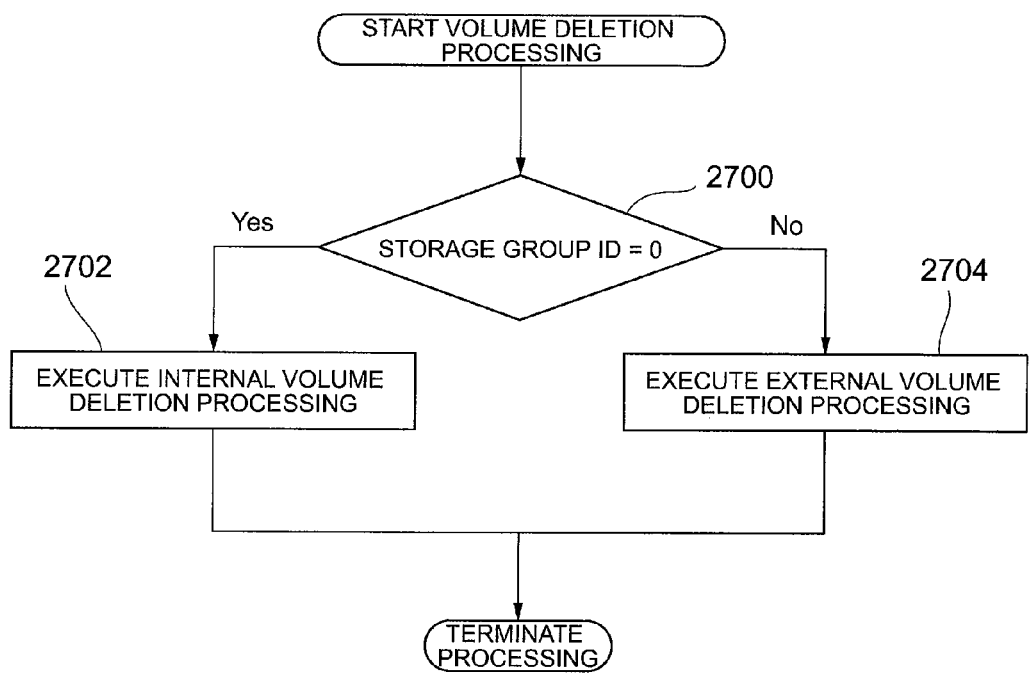
FIG. 27 is an example of a flowchart illustrating volume deletion processing.

FIG. 27 is a flowchart illustrating volume deletion processing. This processing is executed in order to increase the unused capacity of the storage group. After the administrative user inputs a group ID, from which a volume is to be deleted, and a volume ID of the volume to be deleted to the management PC, the SVP checks the storage group ID and judges whether the storage group is an internal storage group or an external storage group (2700). If it is determined that the relevant volume is an internal volume, the SVP executes internal volume deletion processing for, for example, deleting the individual volume information 1302 (FIG. 13) for each volume ID to be deleted, and the individual internal volume information 1402 (FIG. 14) associated with the individual volume information 1302 from the table (2702). On the other hand, if the SVP determines that the storage group ID is a value other than 0, it executes external volume deletion processing (2704).

Figure 28:
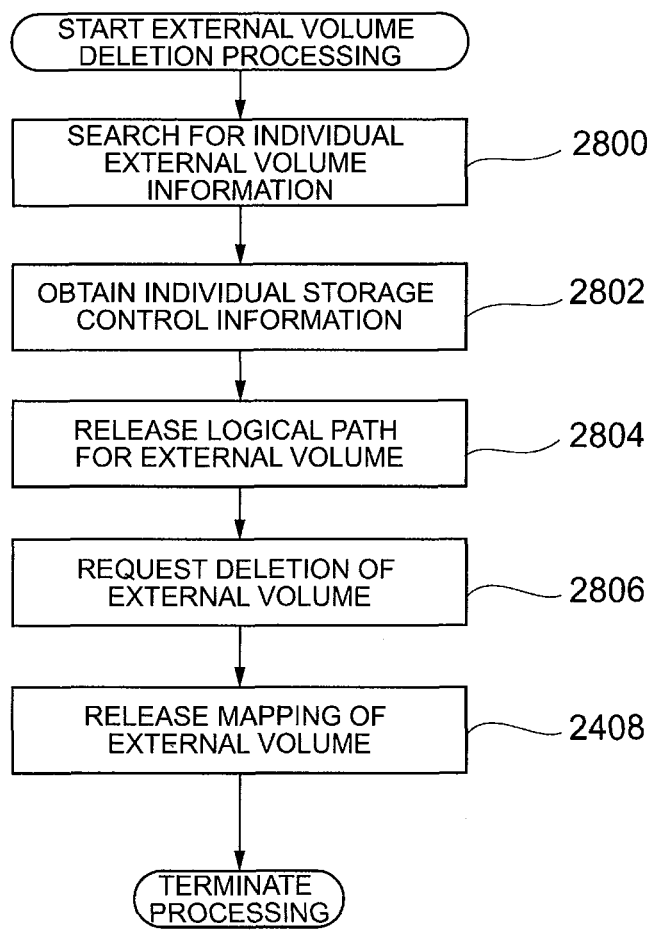
FIG. 28 is an example of a flowchart illustrating external volume deletion processing.

FIG. 28 is a flowchart illustrating the external volume deletion processing. The SVP searches for the individual volume information 1302 (FIG. 13) of the volume ID designated by the administrative user and searches for the individual external volume information 1502 (FIG. 15) corresponding to that external volume ID 13028 (2800).

Next, the SVP obtains the inter-chassis connection path information ID 150260 from the mapping path information 1526 of the individual external volume information; searches for the external storage WWN ID 1608 by referring to the inter-chassis connection path information table 1600 (FIG. 16), using the inter-chassis connection path information ID 150260 as a key; and obtains the corresponding storage control information ID 1004 by referring to the individual external storage WWN information table 1702 (FIG. 17), using the external storage WWN ID 1608 as a key (2802).

Next, the SVP reads a logical path release command by referring to the command issuance route type 1012 and the command destination 1014 registered in the individual storage control information and issues a request to release the logical path for the mapped external volume to the external storage apparatus, using the mapping path information 15026 of the individual external volume information 1502 (FIG. 15) (2804).

The SVP then issues an external volume deletion request to the external storage apparatus, suing a volume deletion command 1026 (FIG. 10) and the volume ID 13020 of the individual external volume information 1502 (2806).

Subsequently, the SVP deletes the individual volume information 1302 (FIG. 13) and the individual external volume information 1502 (FIG. 15) of the volume ID designated by the administrative user; releases mapping of the deleted external volume from the mapping table between the external volume and the virtual volume (2408); and then terminates the processing in this flowchart.

Figure 29:
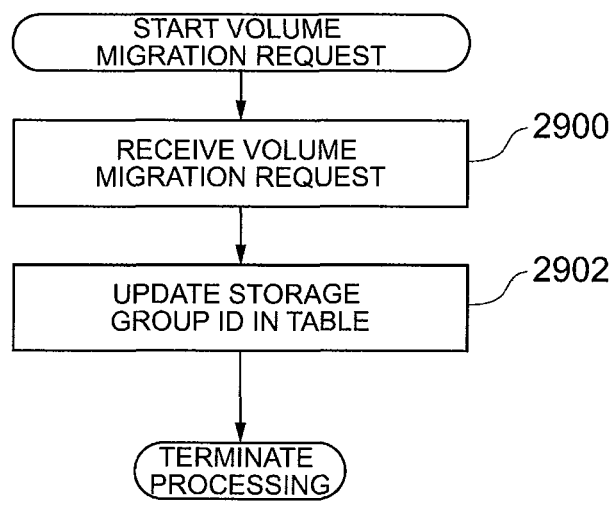
FIG. 29 is an example of a flowchart illustrating volume migration request processing for the next volume relocation processing.

Next, volume relocation processing will be explained. FIG. 29 is a flowchart illustrating volume migration request processing which is a starting step of the volume relocation processing. If the SVP receives the input information (FIG. 9) for a volume migration request from the administrative user (2900), the SVP refers to the individual volume information 1302 of the same volume ID (13020: FIG. 13) based on the volume ID (13020: FIG. 13) which is an object of the migration request and updates and registers the storage group ID, to which the relevant volume is to be migrated, in the storage group ID (1010) area of the individual volume information (2902). As a result, the volume migration request processing is terminated.

The volume relocation processing program for the SVP executes the volume relocation processing according to the relocation schedule 1202 (FIG. 12) registered in the storage group information.

Figure 30:
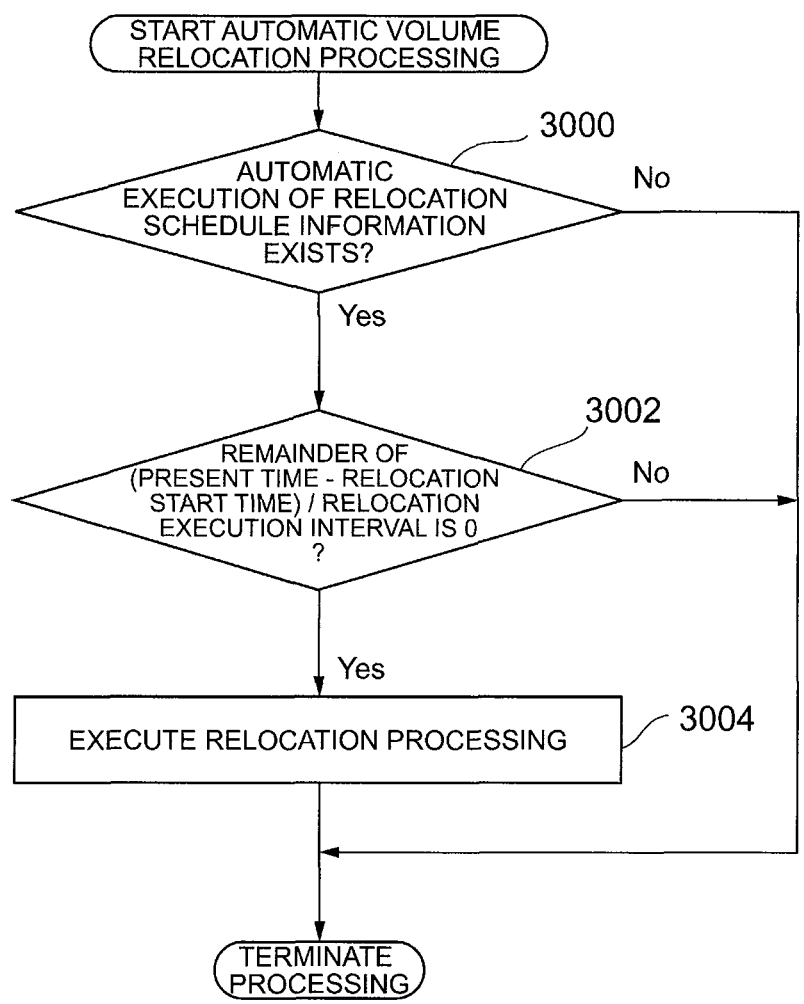
FIG. 30 is a flowchart illustrating automatic volume relocation processing.

FIG. 30 is a flowchart illustrating automatic volume relocation processing. The SVP specifies the relocation schedule information corresponding to the same ID (1010: FIG. 12) based on the volume migration object storage group ID (904: FIG. 9) by referring to the storage group information table 1200 (FIG. 12) and judges the information 12020 about whether the automatic execution setting exists or not (3000). If the SVP determines that the automatic execution setting does not exist, it terminates the processing in this flowchart.

If the SVP determines that the automatic execution setting exists, it then judges whether the time to execute relocation has come or not. For the purpose of this judgment, the SVP finds a difference between the start time of the first relocation and the present time and then judges if this difference is multiples of the relocation execution interval 12024 (FIG. 12) or not (3002).

If an affirmative judgment is returned, the SVP determines that the present time is when the relocation processing should be executed; and then executes the volume relocation processing (3004). The SVP repeatedly executes the automatic volume relocation processing by, for example, interrupt processing.

Figure 31:
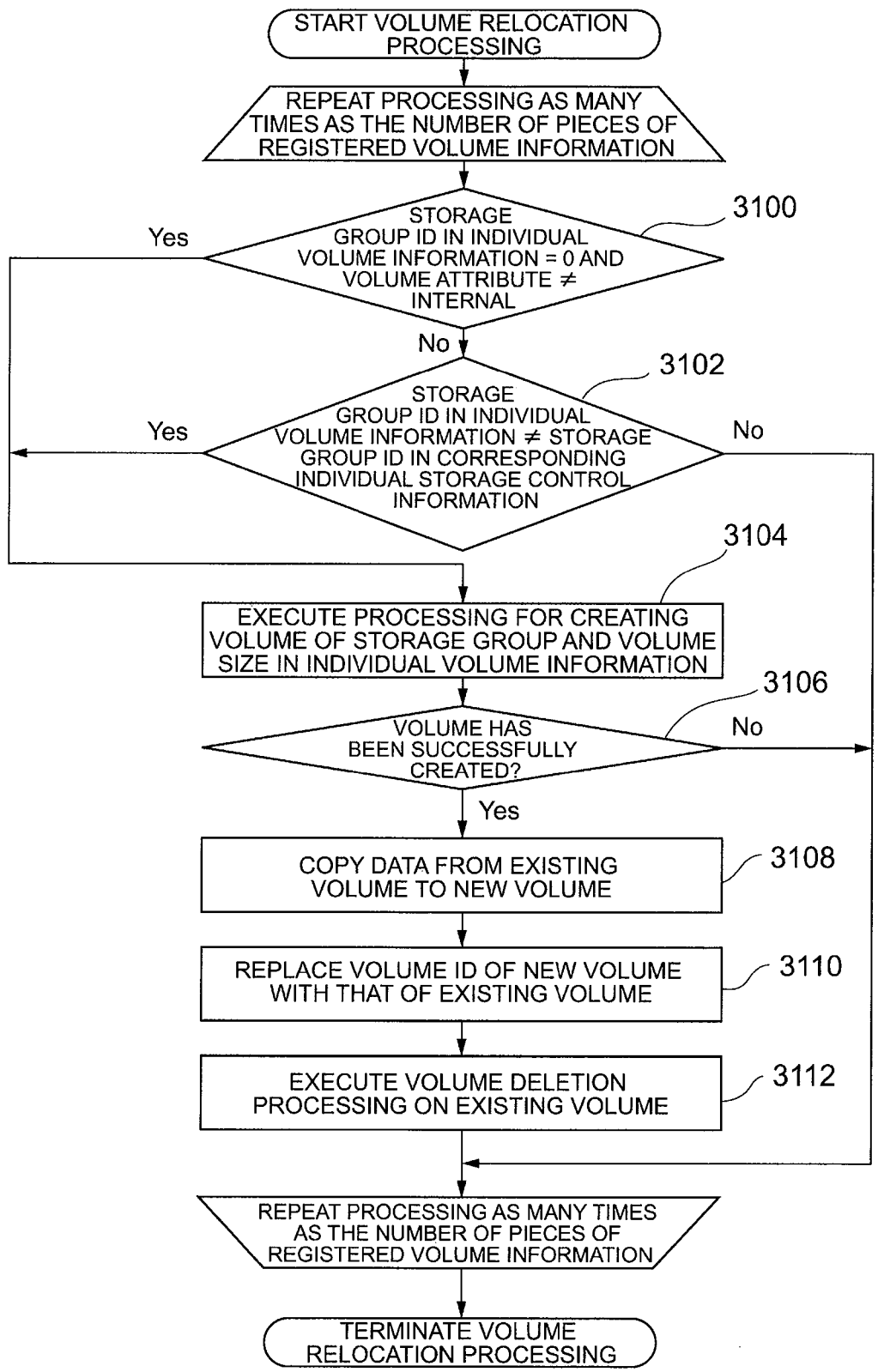
FIG. 31 is an example of a flowchart explaining volume relocation processing.

FIG. 31 is a flowchart illustrating the volume relocation processing. The SVP repeats the steps as many times as the number of the pieces of individual volume information registered in the volume information table 1300. There are a plurality of forms of the volume migration request as follows: migration of an internal volume within the primary storage apparatus; migration of an internal volume to the external storage apparatus; and migration of an external volume between different external storage apparatuses. If the storage group ID 1010 (FIG. 13) of the individual volume information is updated to the migration destination storage group by the volume migration request (FIG. 30), the storage group ID 1010 is no longer consistent with the volume attribute 13026 in the individual volume information table 1302 and the storage group ID 1010 in the individual storage information table 1302 is no longer consistent with the storage group ID 1010 in the individual storage control information table 1002.

Accordingly, the SVP performs the following step in order to determine the above-described inconsistency: if the storage group ID of the individual volume information is 0 and the volume attribute is not internal (3100), the SVP determines that the volume migration request is executed by the administrative user; and executes the volume creation processing, using the storage group (1010) and the volume size (13022) of the individual volume information 1302 (FIG. 13) (3104).

On the other hand, if a negative judgment is returned in step 3100, the SVP compares the storage group ID (1010) in the individual volume information table 1302 with the storage group ID (1010) in the individual storage control information table 1002; and if the SVP determines that they are different from each other, the SVP proceeds to the volume creation processing (3104). If a negative judgment is returned in this judgment step, the SVP determines that the volume migration request is not applied; and then terminates the processing in this flowchart.

If the SVP determines according to the volume creation processing flowchart in FIG. 26 that the volume has been successfully created (3106), the SVP migrates data from the migration source volume to the created new volume (3108); then replaces the ID of the migration source volume with that of the migration destination volume and updates and registers it in the individual volume information table 1302 (3110). Next, the SVP deletes the individual information 1302 of the migration source volume from the volume information table 1300 according to the volume deletion flowcharts shown in FIG. 27 and FIG. 28.

If the primary storage apparatus 20 receives, via the CHA 21A, a read/write request to a virtual volume from the host 10, the microprogram for the CHA 21 refers to the aforementioned management tables in the shared memory 25 and the mapping information; and judges an external volume which is an object of the read/write request to the virtual volume. Furthermore, the CHA 21B refers to the mapping table showing the mapping relationship between logical addresses of the virtual volumes and the logical addresses of the external volumes and then executes read/write processing on the target address of the accessed external volume.

Figure 32:
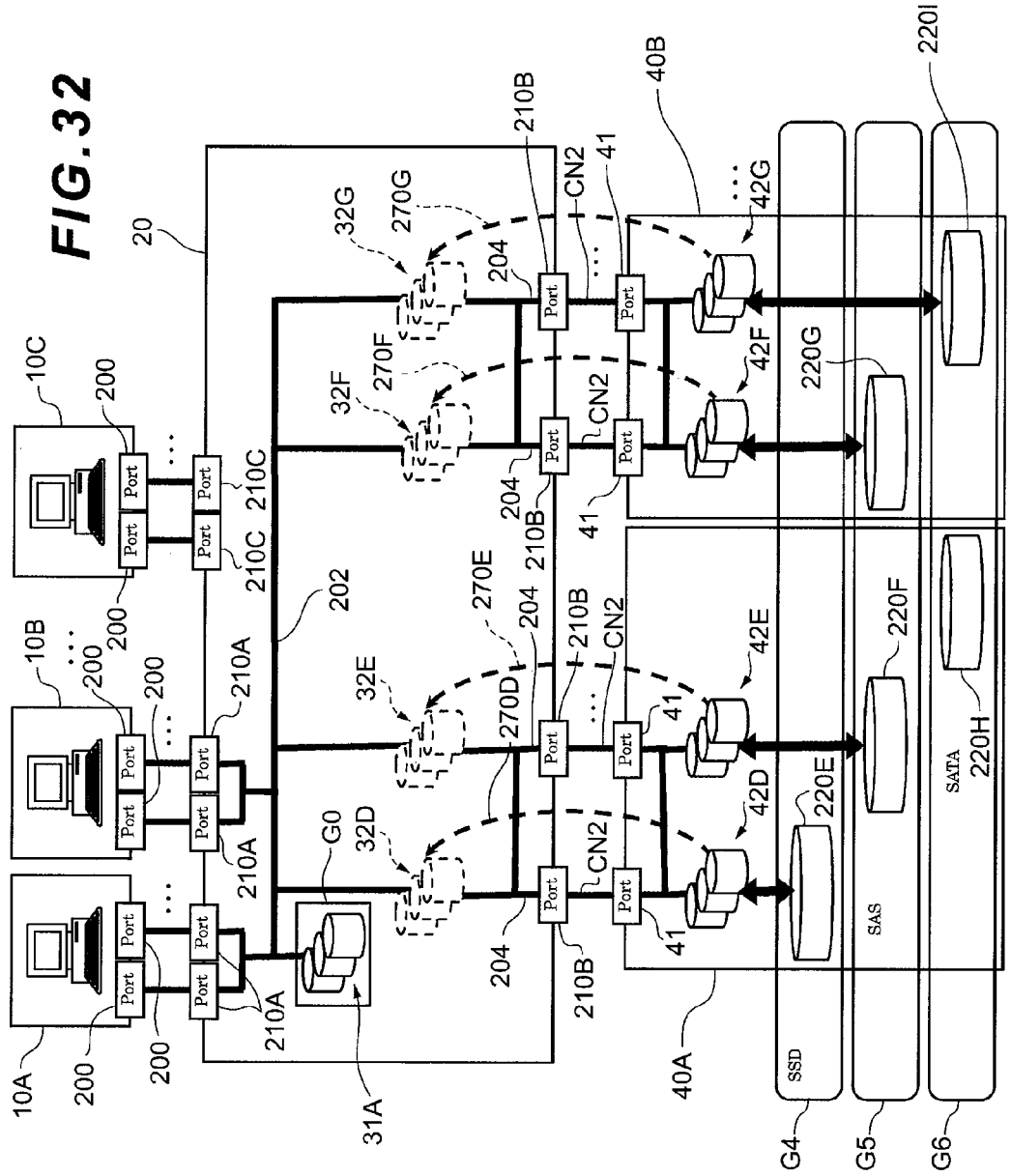
FIG. 32 is a hardware block diagram of a computer system according to a first variation.

Next, a variation of FIG. 2 will be explained. While the storage system shown in FIG. 2 sets storage groups according to the distinction between the primary storage apparatus and the external storage apparatus, a storage system shown in FIG. 32 does not use the above-described distinction, but sets storage groups according to media performance. For example, G4 is a storage group including high-speed, high-performance media (SSD); G5 is a group including media (SAS) whose performance is lower than that of the SAS, but whose bit cost is excellent; and G6 is a group including media (SATA) that prioritizes costs over performance.

Each storage group includes the same type of media across the boundaries of different external storage apparatuses. A PDEV 220E constituted from SSD of the storage apparatus 40A exists in G4. A PDEV 220F constituted from SAS of the storage apparatus 40A and a PDEV 220G constituted from SSD of the storage apparatus 40B exist in G5. A PDEV 220H constituted from SATA of the storage apparatus 40A and a PDEV 220I constituted from SATA of the storage apparatus 40B exist in G6.

External volumes 42D based on the PDEV 220E are mapped to virtual volumes 32D (270D); external volumes 42E based on the PDEV 220F are mapped to virtual volumes 32E (270E); external volumes 42F based on the PDEV 220G are mapped to virtual volumes 32F (270F); and external volumes 42G based on the PDEV 220G are mapped to virtual volumes 32G (270G). No external volume in mounted on the PDEV 220H.

Furthermore, FIG. 33 is a block diagram of another example and explains a form in which storage groups are set according to attributes of storage pools. G7 is a thin provisioning storage pool group and G8 is a storage pool group that does not have the thin provisioning function. G7 has thin provisioning storage pools 3300A, 3300B of the external storage apparatus 40A and a thin provisioning storage pool 3300D of the external storage apparatus 40B. On the other hand, G8 has a thin provisioning storage pool 3300C of the external storage apparatus 40A and a storage pool 3300E of the external storage apparatus 40B.

In response to access from the host 10 to the primary storage apparatus 20, the external storage apparatus 40A sequentially maps pool volumes 42H belonging to the thin provisioning storage pool 3300A to virtual volumes 32H and also sequentially maps pool volumes 42I belonging to the thin provisioning storage pool 3300B to virtual volumes 32I in the same manner. Then, in response to access from the host 10 to the primary storage apparatus 20, the external storage apparatus 40B sequentially maps pool volumes 42J belonging to the thin provisioning storage pool 3300D to virtual volumes 32J. Meanwhile, volumes 42K of the storage pool 3300E belonging to G8 are mapped to virtual volumes 32K. Incidentally, no external volume is set to the storage pool.

INDUSTRIAL APPLICABILITY

According to this invention, if the user makes a new volume setting request to a primary storage apparatus by designating a storage group without being aware of the difference between the primary storage apparatus and an external storage apparatus, a management mechanism for the primary storage apparatus executes processing for setting the volume to the external storage apparatus. Therefore, this invention can facilitates the user setting such as volume creation in an external connection mechanism where the external storage apparatus is connected to the primary storage apparatus.

REFERENCE SIGNS LIST

10 Host
10-1 Management PC
20 Primary storage apparatus (first storage apparatus)
23 SVP
25 Shared memory
31A, 31B Internal volumes
32 Virtual volume
40 External storage apparatus (second storage apparatus)
42 External volume

The invention claimed is:

1. A computer system comprising a first storage apparatus, wherein the first storage apparatus includes:
a port for external connection with a second storage apparatus;
a virtual volume to which a volume in the second storage apparatus is mapped;
a memory storing a command group for setting the volume to the second storage apparatus; and
a controller for storing write data in the volume in response to a write request from a host to the virtual volume and fetching read data from the volume in response to a read request from the host to the virtual volume; and
wherein the controller judges whether a volume creation request to the first storage apparatus is either a request to create a volume in the first storage apparatus or a request to create a volume in the second storage apparatus;
if it is determined that the volume creation request is the request to create a volume in the second storage apparatus, the controller sends the command group to the second storage apparatus; and
after receiving information about the volume, which has been set, from the second storage apparatus, the controller stores the information about the volume in the memory, wherein
the first storage apparatus has a port for receiving management information from a management device,
the management device classifies the first storage apparatus and the second storage apparatus into a plurality of storage groups and sends management information about the classification to the port,
the memory stores identification information about each of the plurality of storage groups, and
the controller performs the judgment on the volume creation request based on the identification information contained in the volume creation request.

2. The computer system according to claim 1, wherein the management device classifies a plurality of second storage apparatuses into separate storage groups.

3. The computer system according to claim 1, wherein the command group includes a first command for creating the volume and a second command for setting a logical path to the created volume; and
wherein if the second storage apparatus receives the first command, it creates the volume;
if the second storage apparatus receives the second command, it sets a logical path between the volume and a port connected to the first storage apparatus; and
the second storage apparatus sends management information about the volume and management information about the logical path to the first storage apparatus; and
wherein the first storage apparatus maps a second volume to the virtual volume based on the management information.

4. The computer system according to claim 3, wherein the volume creation request is supplied together with the identification information from the management device to the first storage apparatus; and
wherein the first storage apparatus identifies the second storage apparatus, which is an object of the volume creation request, based on the identification information in the volume creation request;

selects the command group applicable to the identified second storage apparatus; and sends the selected command group to the identified second storage apparatus.

5. The computer system according to claim 3, wherein when the port of the first storage apparatus receives a registration request from the management device for registering the second storage apparatus in the first storage apparatus, the first storage apparatus sends a third command for searching for port information about the second storage apparatus to the second storage apparatus and sets, to the memory, connection path information between the first storage apparatus and the second storage apparatus based on response information in response to the third command.

6. The computer system according to claim 5, wherein the registration request includes a parameter for the command group that is applicable to the second storage apparatus.

7. The computer system according to claim 1, wherein the controller for the first storage apparatus migrates the volume from a storage group, to which the volume belongs, to another storage group according a request from the management device.

8. The computer system according to claim 7, wherein the request from the management device includes the identification information about the storage group to which the volume is to be migrated.

9. The computer system according to claim 8, wherein the controller identifies the second storage apparatus, to which the volume is to be migrated, based on the identification information;

sends the command group to the second storage apparatus; and transfers data of the migration object volume to a new volume that is set by the command group.

10. The computer system according to claim 8, wherein the controller compares an attribute of the migration object volume with an attribute of the storage group to which the volume belongs; and executes the migration based on the comparison result.

11. A control method applied to a computer system in which an external storage apparatus and a management device are connected to a primary storage apparatus, the computer system control method comprising:

a step executed by the management device of registering, in the primary storage apparatus, management information about the external storage apparatus;

a step executed by the management device of registering, in the primary storage apparatus, a command for setting a new volume to the external storage apparatus;

a step executed by the management device for requesting the primary storage apparatus to set the new volume;

a step executed by the primary storage apparatus of judging whether the new volume should be set to the primary storage apparatus or the external storage apparatus, according to the request;

a step executed by the primary storage apparatus of sending the command to the external storage apparatus if it is determined that the new volume should be set to the external storage apparatus;

a step executed by the external storage apparatus of creating the new volume and setting a logical path for the new volume according to the command;

a step executed by the primary storage apparatus of registering information about the new volume and information about the logical path in the memory;

a step executed by the primary storage apparatus of receiving management information from the management device;

a step executed by the management device of classifying the primary storage apparatus and the external storage apparatus into a plurality of storage groups and sending management information about the classification to a port of the primary storage apparatus; and a step executed by the primary storage apparatus of registering identification information about each of the plurality of storage groups, wherein the step executed by the primary storage apparatus of judgment on the volume creation request is based on the identification information contained in the volume creation request.

* * * * *